(12) United States Patent
Snider

(10) Patent No.: US 9,896,026 B2
(45) Date of Patent: Feb. 20, 2018

(54) SLIDER WINDOW ASSEMBLY WITH INTEGRATED LIGHTING

(71) Applicant: MAGNA MIRRORS OF AMERICA, INC., Holland, MI (US)

(72) Inventor: Darin J. Snider, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 25 days.

(21) Appl. No.: 14/992,255

(22) Filed: Jan. 11, 2016

(65) Prior Publication Data
US 2016/0200241 A1 Jul. 14, 2016

Related U.S. Application Data

(60) Provisional application No. 62/128,665, filed on Mar. 5, 2015, provisional application No. 62/104,290, filed
(Continued)

(51) Int. Cl.
| | |
|---|---|
| *B60Q 1/26* | (2006.01) |
| *B60J 1/18* | (2006.01) |
| *B60Q 1/30* | (2006.01) |
| *F21S 8/10* | (2006.01) |
| *B60Q 3/30* | (2017.01) |
| *B60Q 1/44* | (2006.01) |
| *F21Y 107/90* | (2016.01) |

(52) U.S. Cl.
CPC ............ *B60Q 1/268* (2013.01); *B60J 1/1853* (2013.01); *B60Q 1/302* (2013.01); *B60Q 3/30* (2017.02); *F21S 48/211* (2013.01); *F21S 48/215* (2013.01); *F21S 48/218* (2013.01); *F21S 48/234* (2013.01); *B60Q 1/44* (2013.01); *F21Y 2107/90* (2016.08)

(58) Field of Classification Search
CPC ........ B60Q 2/168; B60Q 1/302; B60J 1/1853; F21S 48/215; F21S 48/218
USPC ................. 296/146.15, 146.16; 362/503, 541
See application file for complete search history.

(56) References Cited

U.S. PATENT DOCUMENTS

| | | | |
|---|---|---|---|
| 4,488,141 A | 12/1984 | Ohlenforst et al. | |
| 4,645,970 A | 2/1987 | Murphy | |

(Continued)

FOREIGN PATENT DOCUMENTS

DE 9114246 11/1991

OTHER PUBLICATIONS

Sanchez, Dan, "Lighting Up Cap and Tonneau Sales," Trucking Times.com, Wiesner Media 2015.

*Primary Examiner* — Jason S Morrow
(74) *Attorney, Agent, or Firm* — Gardner, Linn, Burkhart & Flory, LLP

(57) ABSTRACT

A rear window assembly for a vehicle includes a fixed window panel. The rear window assembly may be a rear slider window assembly and may include a frame portion having an upper rail and a lower rail, with the fixed window panel fixed relative to the frame portion and defining an opening, and with a movable window panel movable along the upper rail and the lower rail so as to be movable between a closed position and an opened position. A lighting device is disposed at an inner surface of the fixed window panel. The lighting device is operable to emit light that passes through the fixed window panel so as to be viewable by a person viewing the slider window assembly from exterior and rearward of the vehicle.

27 Claims, 28 Drawing Sheets

Related U.S. Application Data on Jan. 16, 2015, provisional application No. 62/102,725, filed on Jan. 13, 2015.

(56) References Cited

U.S. PATENT DOCUMENTS

| | | | |
|---|---|---|---|
| 4,758,931 A | 7/1988 | Gabaldon | |
| 4,896,136 A | 1/1990 | Hotovy | |
| 4,920,698 A | 5/1990 | Friese et al. | |
| 4,995,195 A | 2/1991 | Olberding et al. | |
| 5,016,145 A | 5/1991 | Singleton | |
| 5,050,051 A | 9/1991 | Machida et al. | |
| 5,146,712 A | 9/1992 | Hlavaty | |
| 5,211,466 A | 5/1993 | Jarocki et al. | |
| 5,400,225 A | 3/1995 | Currie | |
| 5,531,046 A | 7/1996 | Kollar et al. | |
| 5,572,376 A | 11/1996 | Pace | |
| 5,799,444 A | 9/1998 | Freimark et al. | |
| 5,831,523 A * | 11/1998 | Lange | B60Q 1/302 315/82 |
| 5,839,231 A | 11/1998 | Gebhart et al. | |
| 5,996,284 A | 12/1999 | Freimark et al. | |
| 6,026,611 A | 2/2000 | Ralston et al. | |
| 6,086,230 A | 7/2000 | Wooldridge et al. | |
| 6,119,401 A | 9/2000 | Lin et al. | |
| 6,536,930 B1 | 3/2003 | Hirmer | |
| 6,691,464 B2 | 2/2004 | Nestell et al. | |
| 6,955,009 B2 | 10/2005 | Rasmussen | |
| 7,003,916 B2 | 2/2006 | Nestell et al. | |
| 7,036,965 B2 | 5/2006 | Dalton, Jr. et al. | |
| 7,048,400 B2 | 5/2006 | Murasko et al. | |
| 7,073,293 B2 | 7/2006 | Galer | |
| 7,172,322 B2 | 2/2007 | Pommeret et al. | |
| 7,347,608 B2 | 3/2008 | Emde | |
| 7,575,349 B2 | 8/2009 | Bucher et al. | |
| 7,642,908 B2 | 1/2010 | Mertens | |
| 8,047,691 B2 | 11/2011 | Leese et al. | |
| 8,151,519 B2 | 4/2012 | Bello et al. | |
| 8,382,350 B2 | 2/2013 | Gold | |
| 8,402,695 B2 | 3/2013 | Smith et al. | |
| 8,408,773 B2 | 4/2013 | Judge | |
| 8,881,458 B2 | 11/2014 | Snider et al. | |
| 8,882,318 B2 | 11/2014 | Pfeil et al. | |
| 8,915,018 B2 | 12/2014 | Snider | |
| 8,938,914 B2 | 1/2015 | Hulst et al. | |
| 2002/0152686 A1 | 10/2002 | Whitehead | |
| 2003/0213179 A1 | 11/2003 | Galer | |
| 2004/0020131 A1 | 2/2004 | Galer et al. | |
| 2006/0092658 A1 | 5/2006 | Scholz | |
| 2006/0107600 A1 | 5/2006 | Nestell et al. | |
| 2007/0217213 A1 * | 9/2007 | Chang | B60Q 1/268 362/503 |
| 2008/0127563 A1 | 6/2008 | Tooker | |
| 2008/0155902 A1 | 7/2008 | Kaiser | |
| 2010/0149826 A1 * | 6/2010 | Leese | B60Q 1/302 362/485 |
| 2014/0047772 A1 | 2/2014 | Hulst | |
| 2015/0314672 A1 * | 11/2015 | Lahnala | E05D 15/0621 49/413 |

* cited by examiner

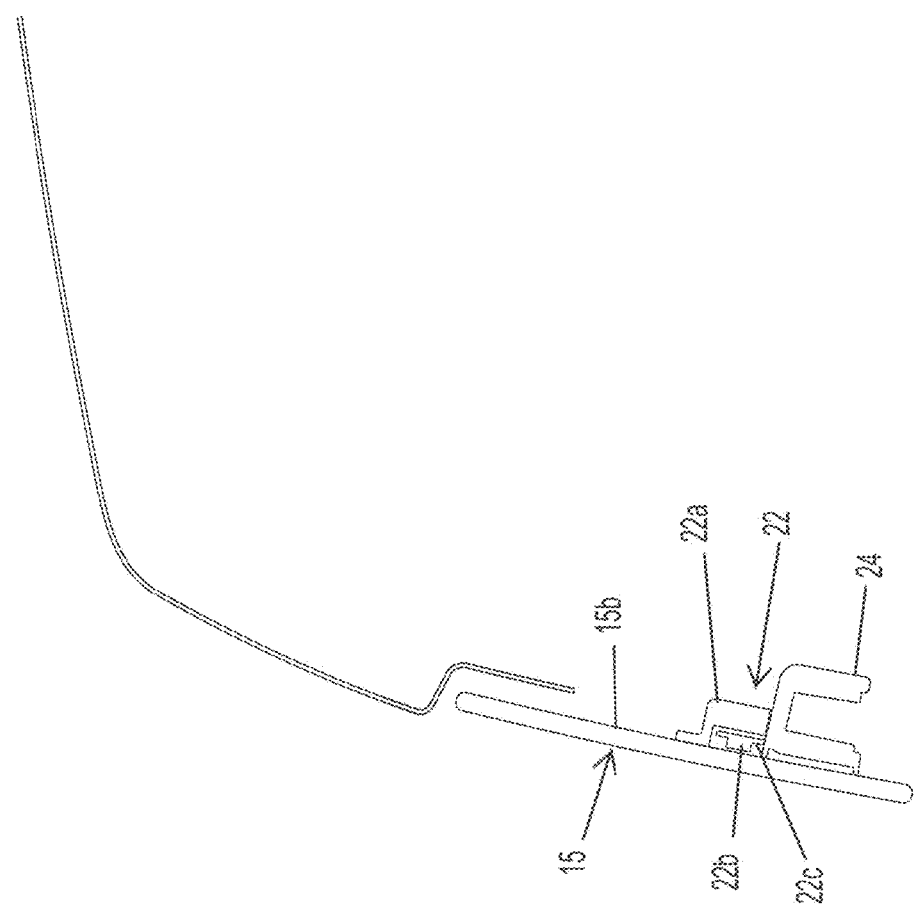

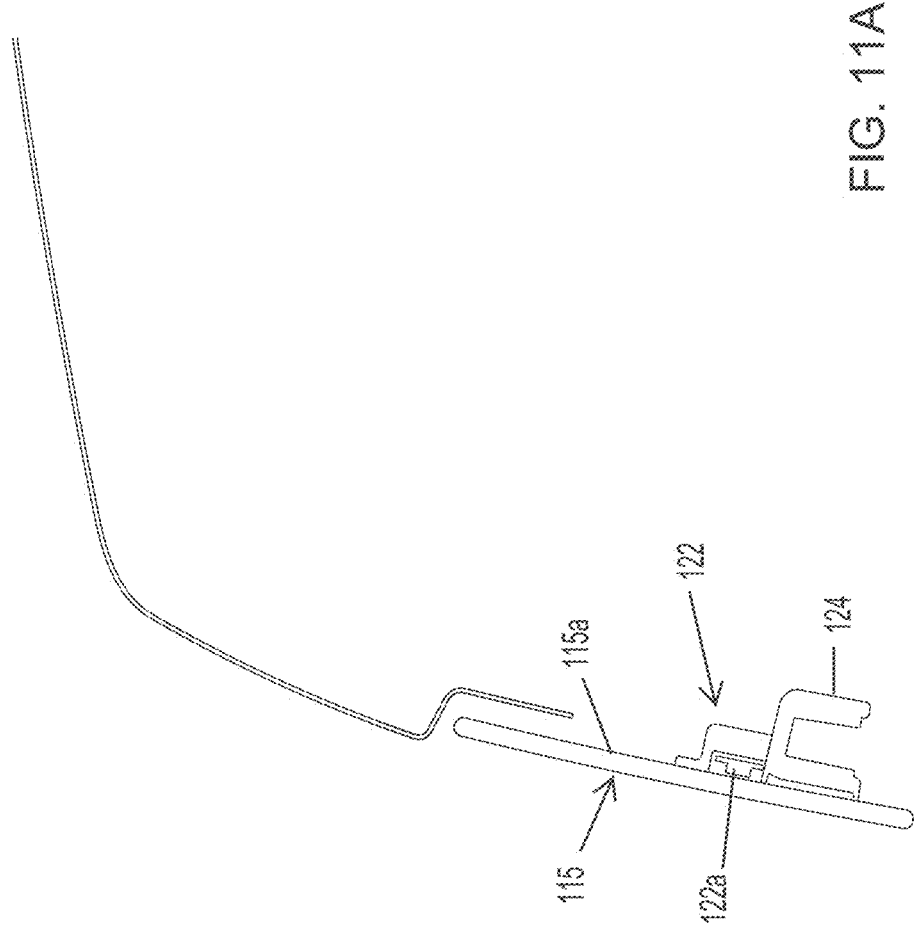

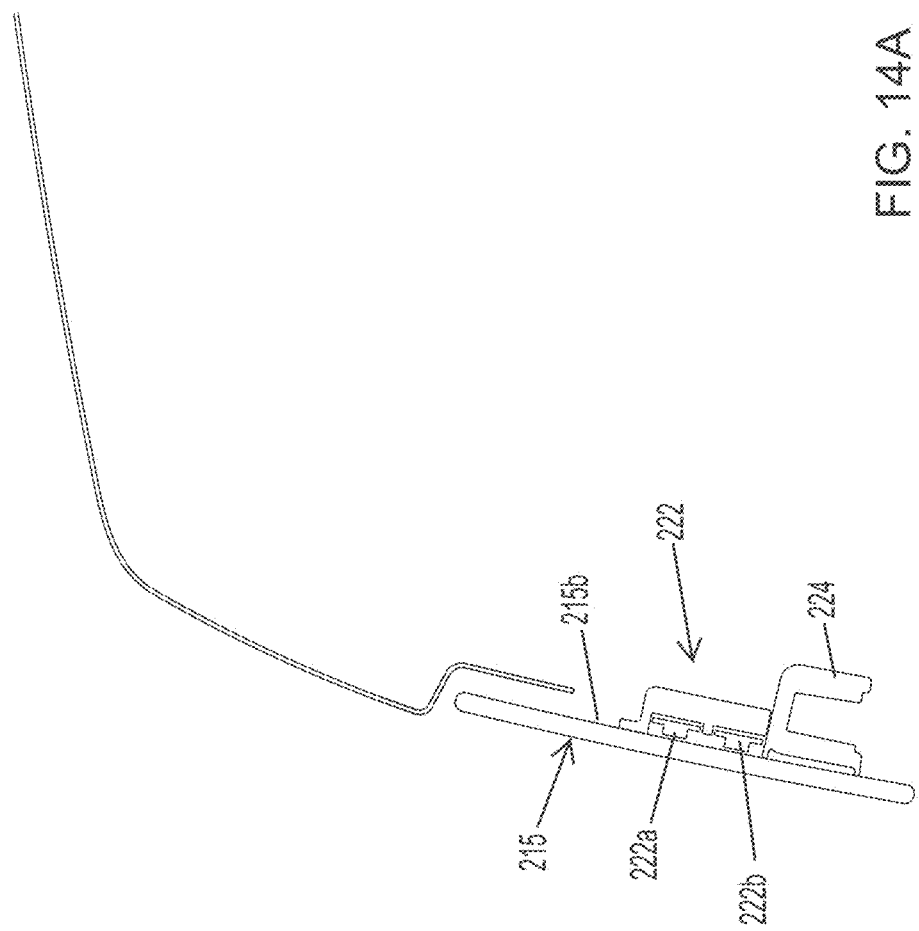

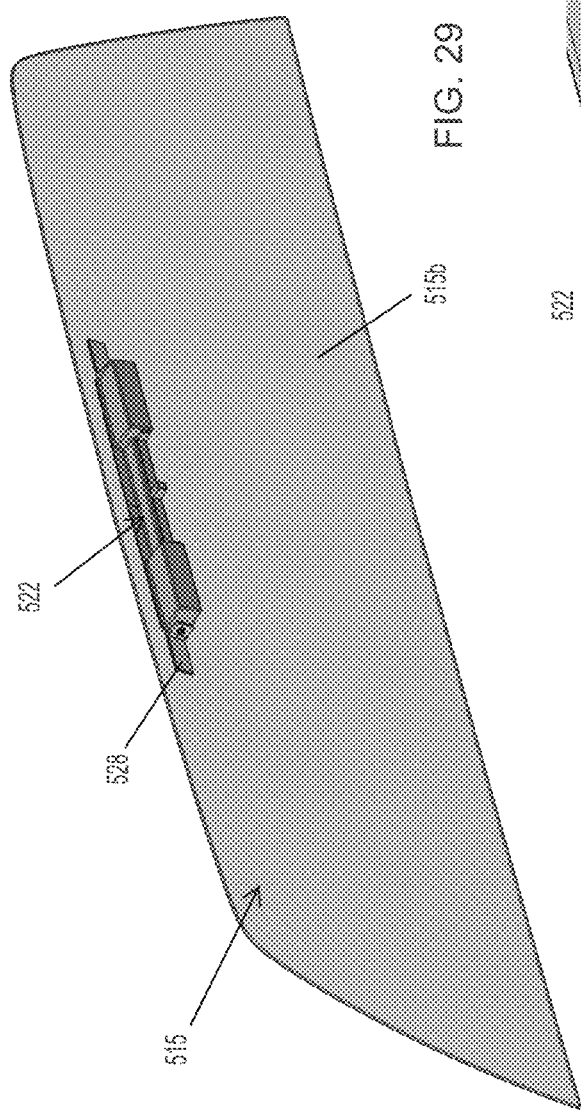
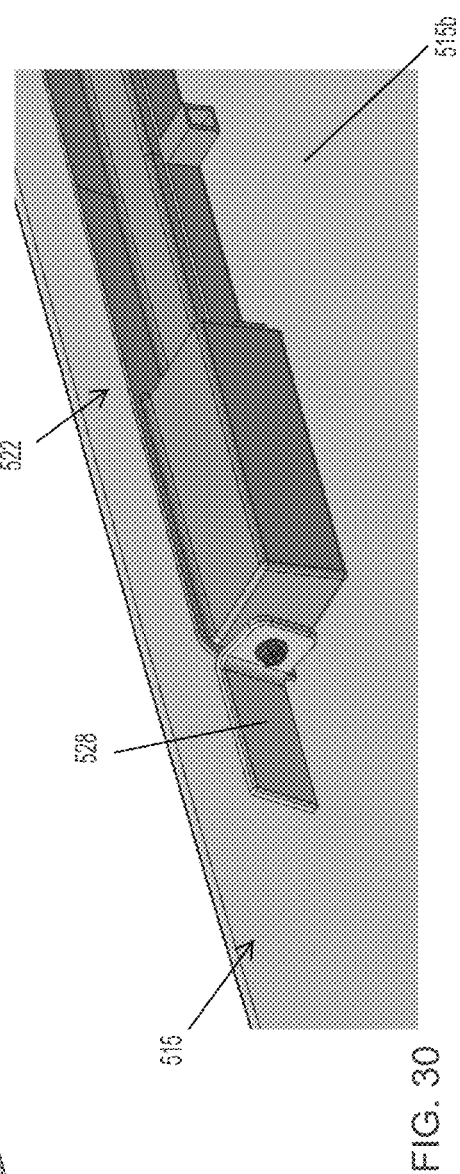

SLIDER WINDOW ASSEMBLY WITH INTEGRATED LIGHTING

CROSS REFERENCE TO RELATED APPLICATIONS

The present application claims the filing benefits of U.S. provisional applications, Ser. No. 62/128,665, filed Mar. 5, 2015, Ser. No. 62/104,290, filed Jan. 16, 2015, and Ser. No. 62/102,725, filed Jan. 13, 2015, which are hereby incorporated herein by reference in their entireties.

FIELD OF THE INVENTION

The present invention relates to a slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety.

SUMMARY OF THE INVENTION

The present invention provides a rear slider window assembly that includes a lighting device having one or more strips or rows of light sources disposed behind the fixed glass window panel of the window assembly so as to provide a flush glass window assembly with lighting viewable through the fixed glass window panel. The light sources may comprise red light-emitting sources for a center high mounted stop lamp (CHMSL) of the vehicle and/or may comprise white light-emitting (or other color) light sources for a truck bed illumination function or the like. The lighting device is electrically connected to a wiring harness or circuitry or user input of the vehicle when the window assembly is installed or mounted at the vehicle.

These and other objects, advantages, purposes and features of the present invention will become apparent upon review of the following specification in conjunction with the drawings.

BRIEF DESCRIPTION OF THE DRAWINGS

FIG. 6A is a sectional view taken along the line A-A in FIG. 6;

FIG. 11A is a sectional view taken along the line A-A in FIG. 11;

FIG. 14A is a sectional view taken along the line A-A in FIG. 14;

FIG. 29 is a perspective view of another rear window assembly having a lighting device in accordance with the present invention; and FIG. 30 is an enlarged perspective view of the rear window assembly and lighting device of FIG. 29, showing a bracket used to attach the lighting device at the glass window panel of the rear window assembly in accordance with the present invention.

DESCRIPTION OF THE PREFERRED EMBODIMENTS

Figure 1:
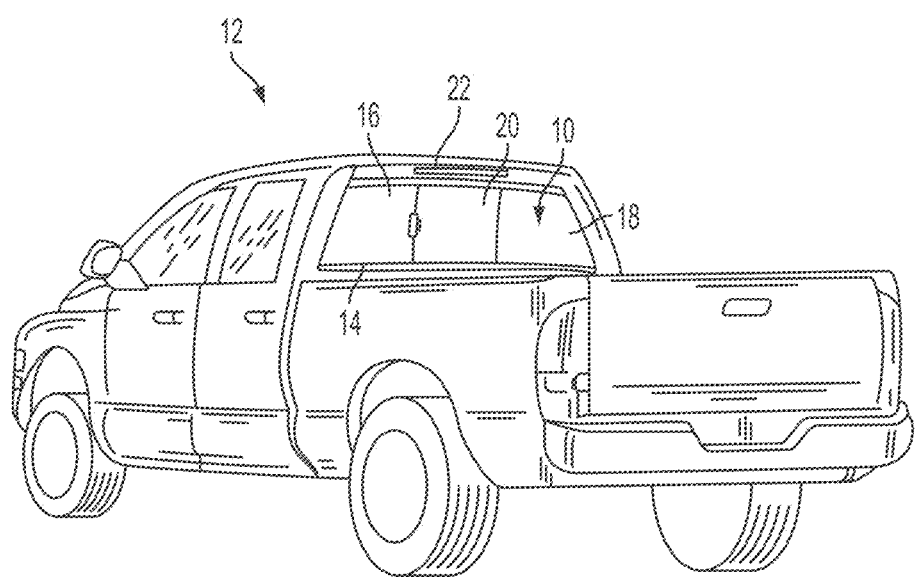
FIG. 1 is a rear perspective view of a pickup truck having a rear slider window assembly in accordance with the present invention.
Figure 2:
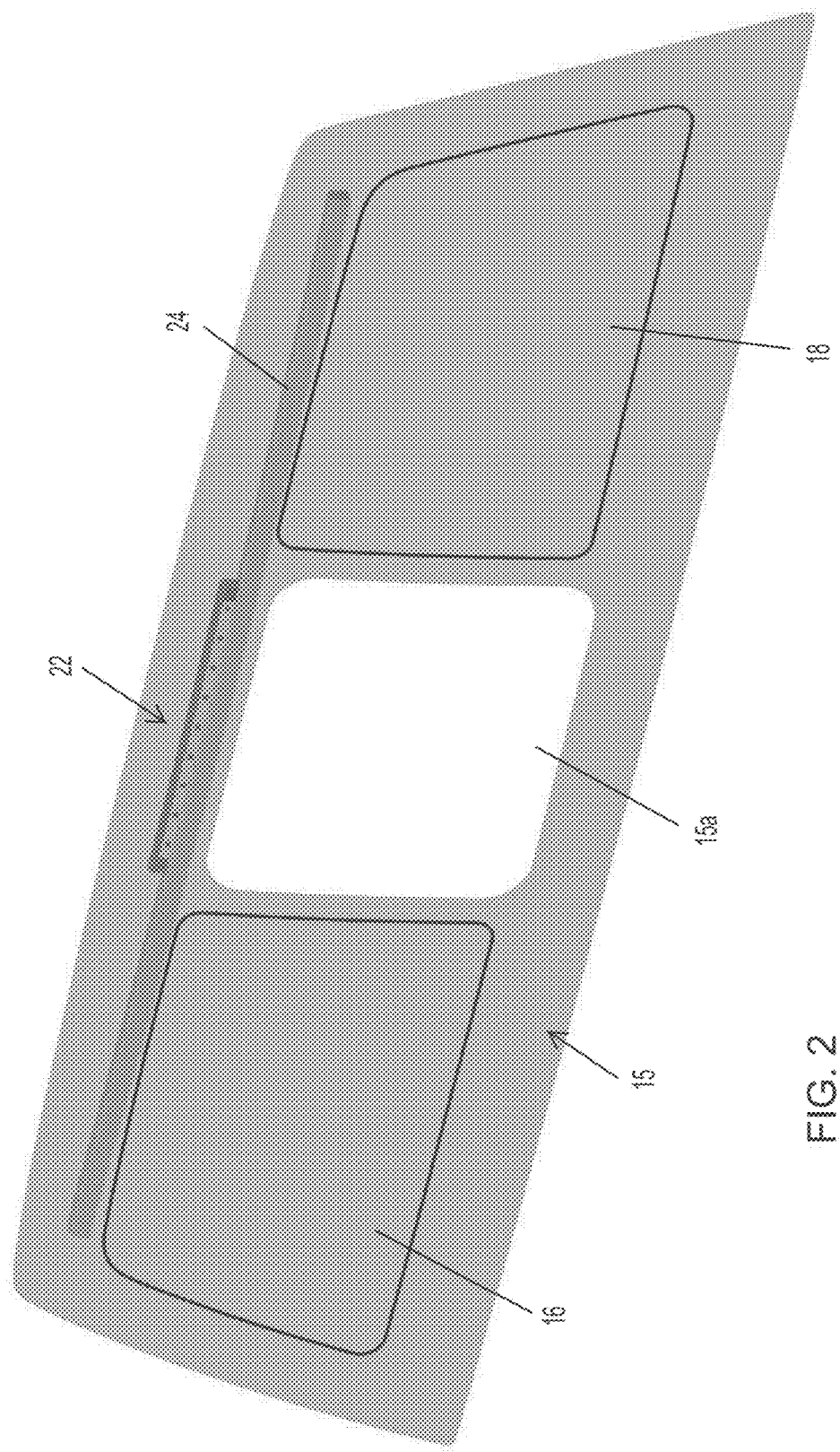
FIGS. 2 and 3 are rear perspective views of the fixed window panel and lighting device of the rear slider window assembly of the present invention.
Figure 3:
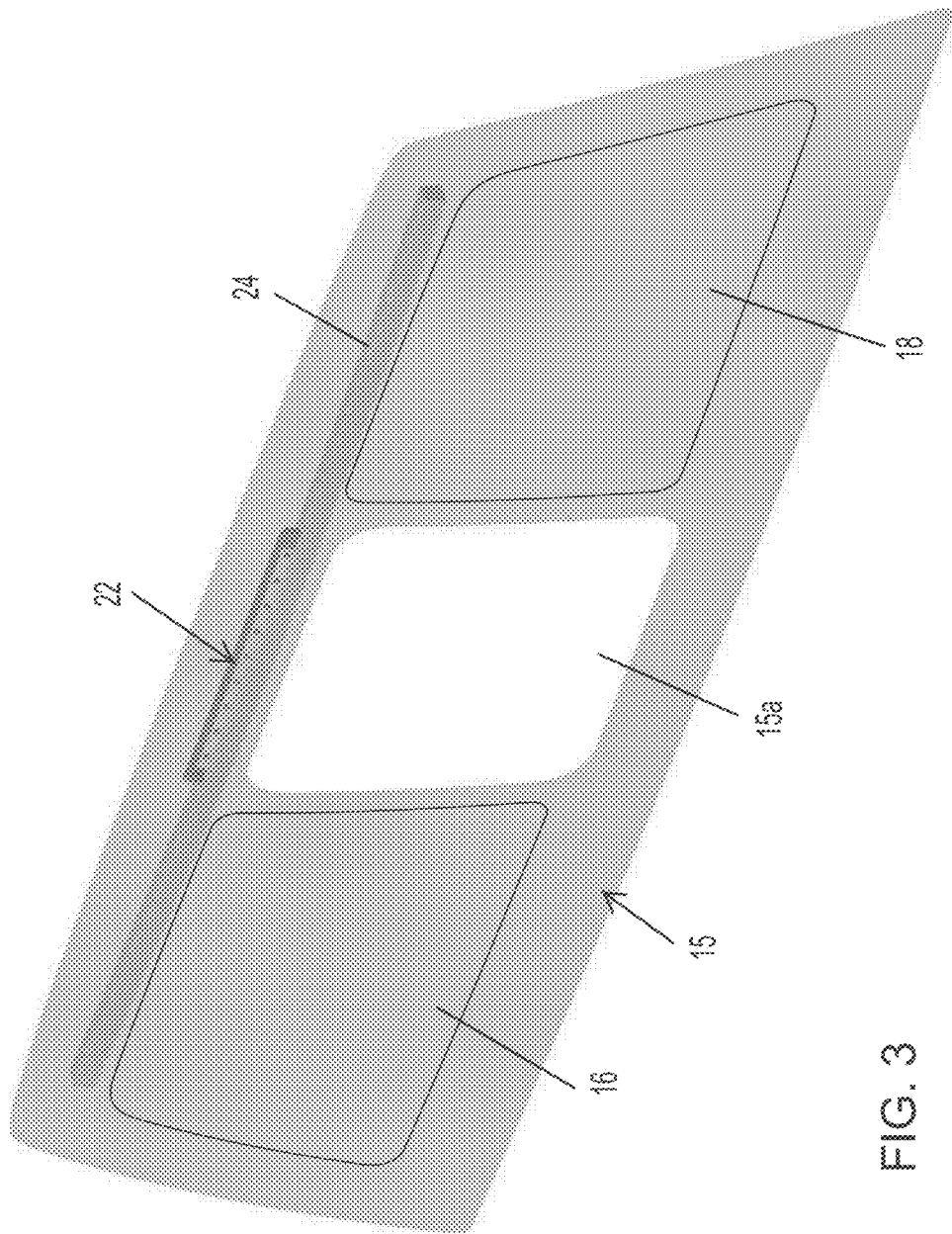
Figure 4:
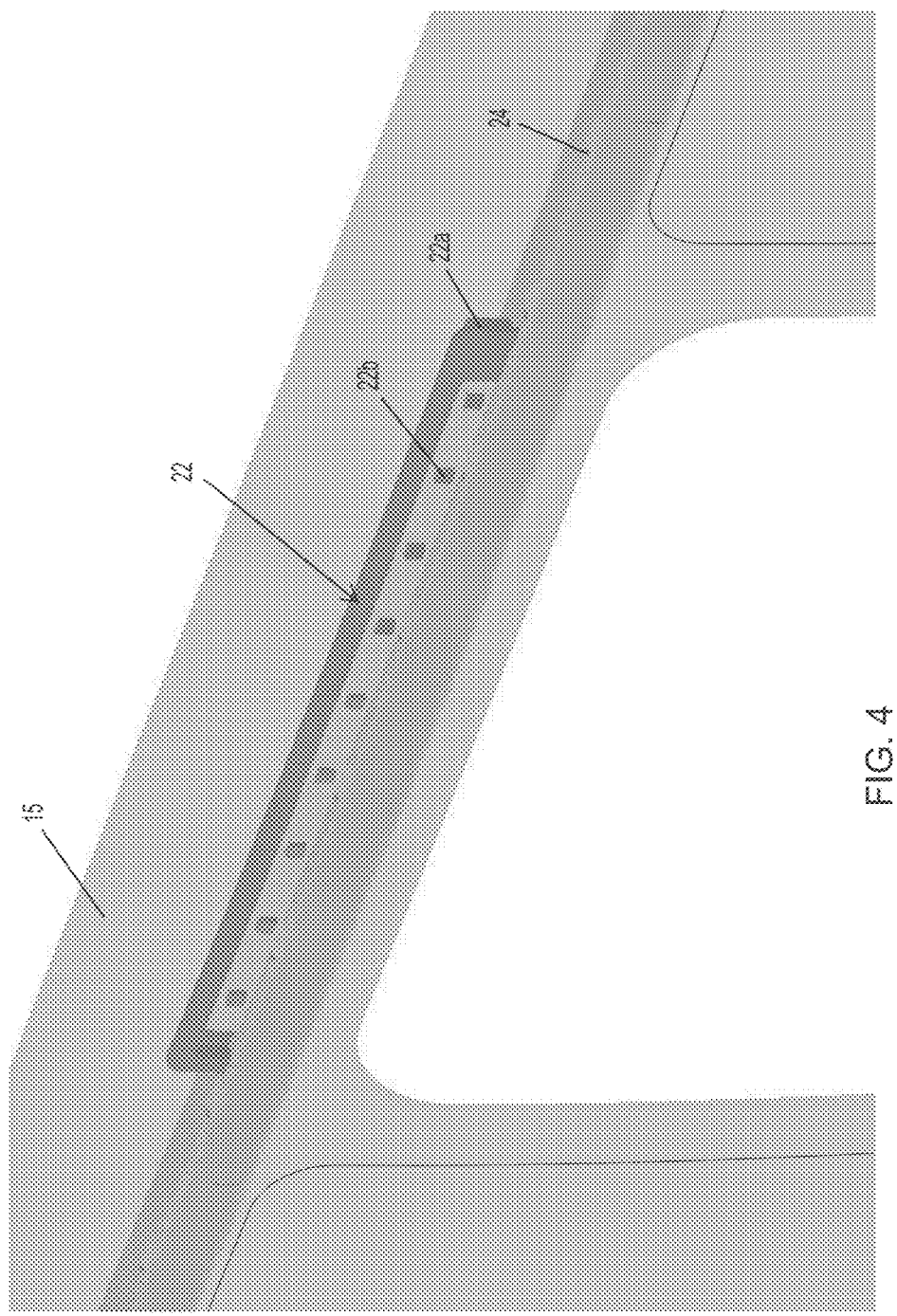
FIG. 4 is an enlarged perspective view of the lighting device of FIGS. 2 and 3.
Figure 5:
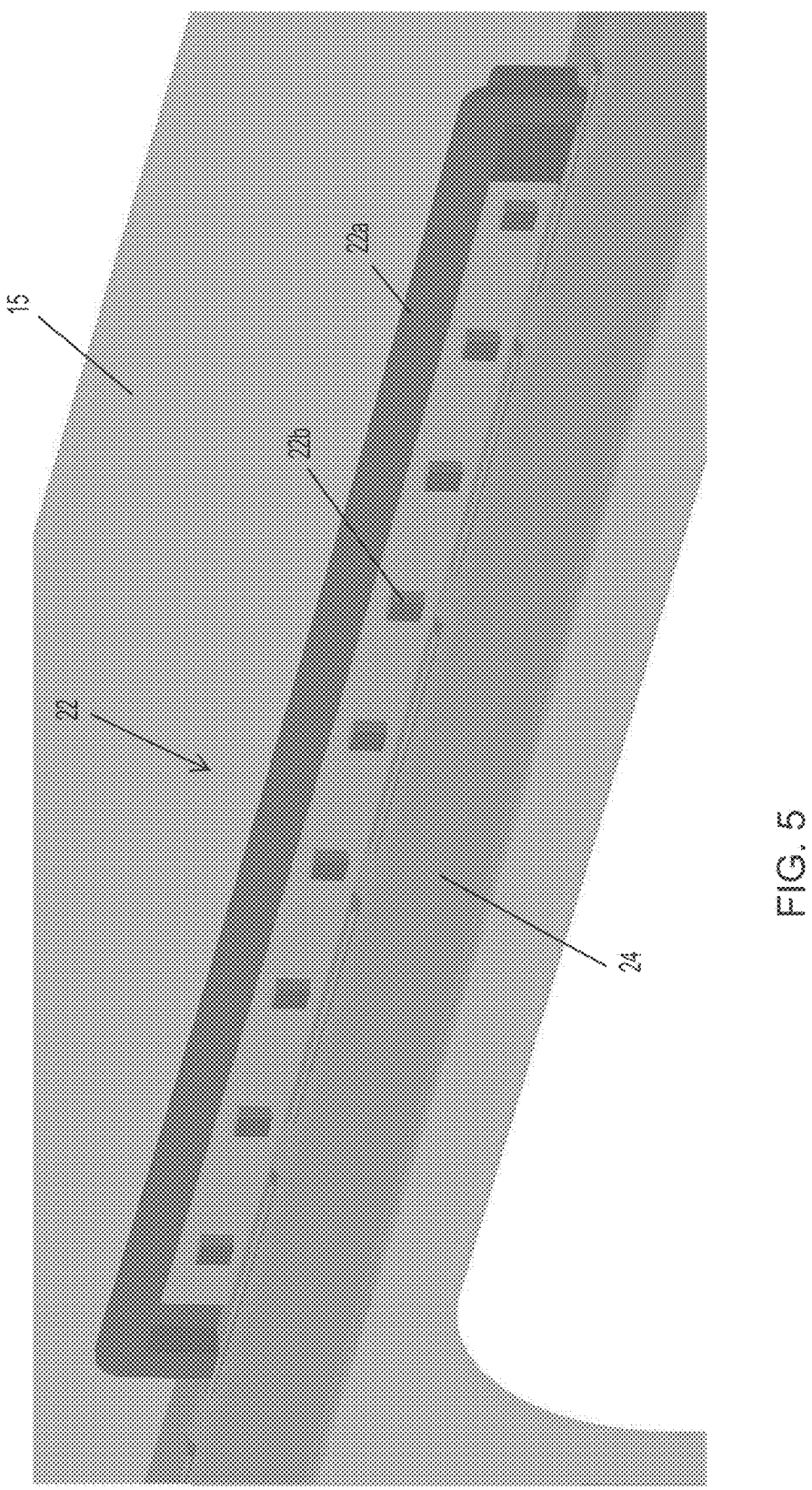
FIG. 5 is an enlarged perspective view of the lighting device of FIG. 4.
Figure 6:
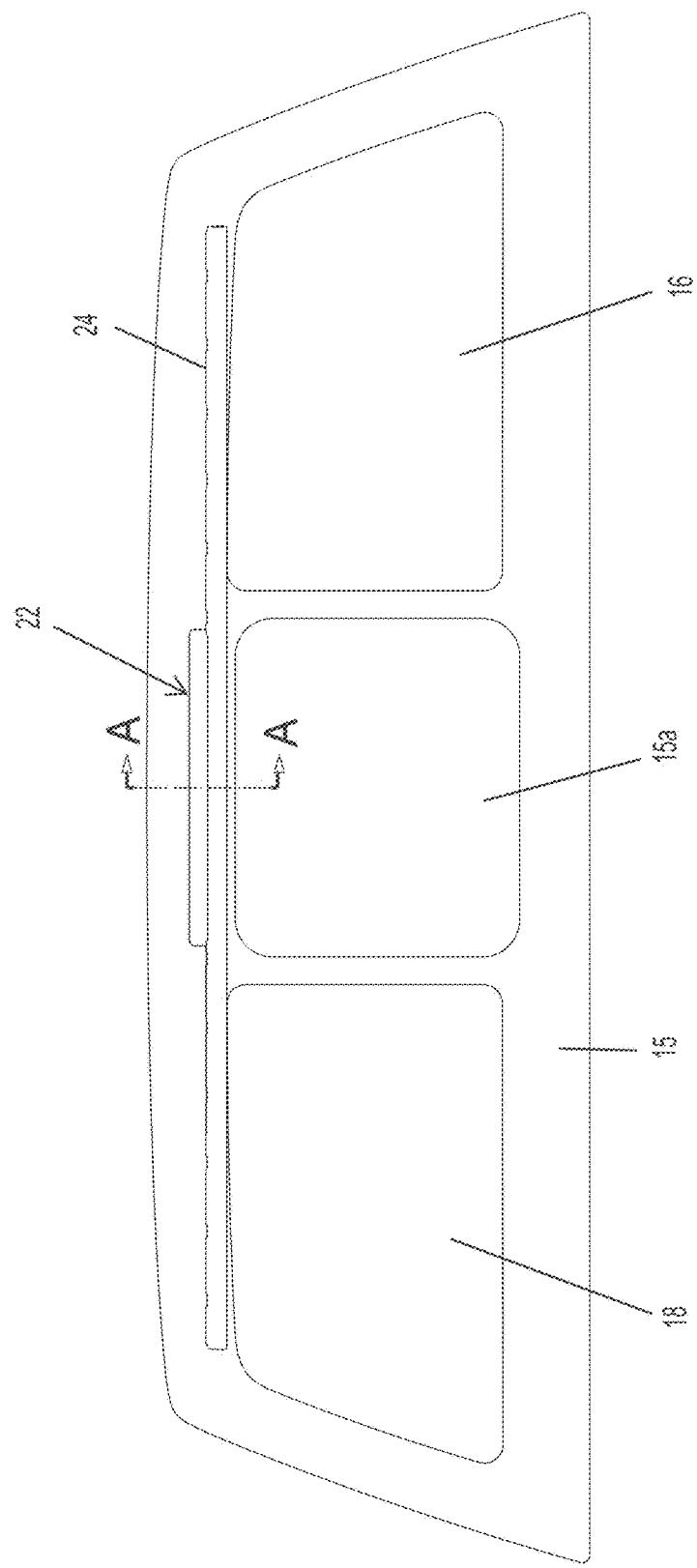
FIG. 6 is a front plan view of the fixed window panel and lighting device of the present invention.
Figure 7:
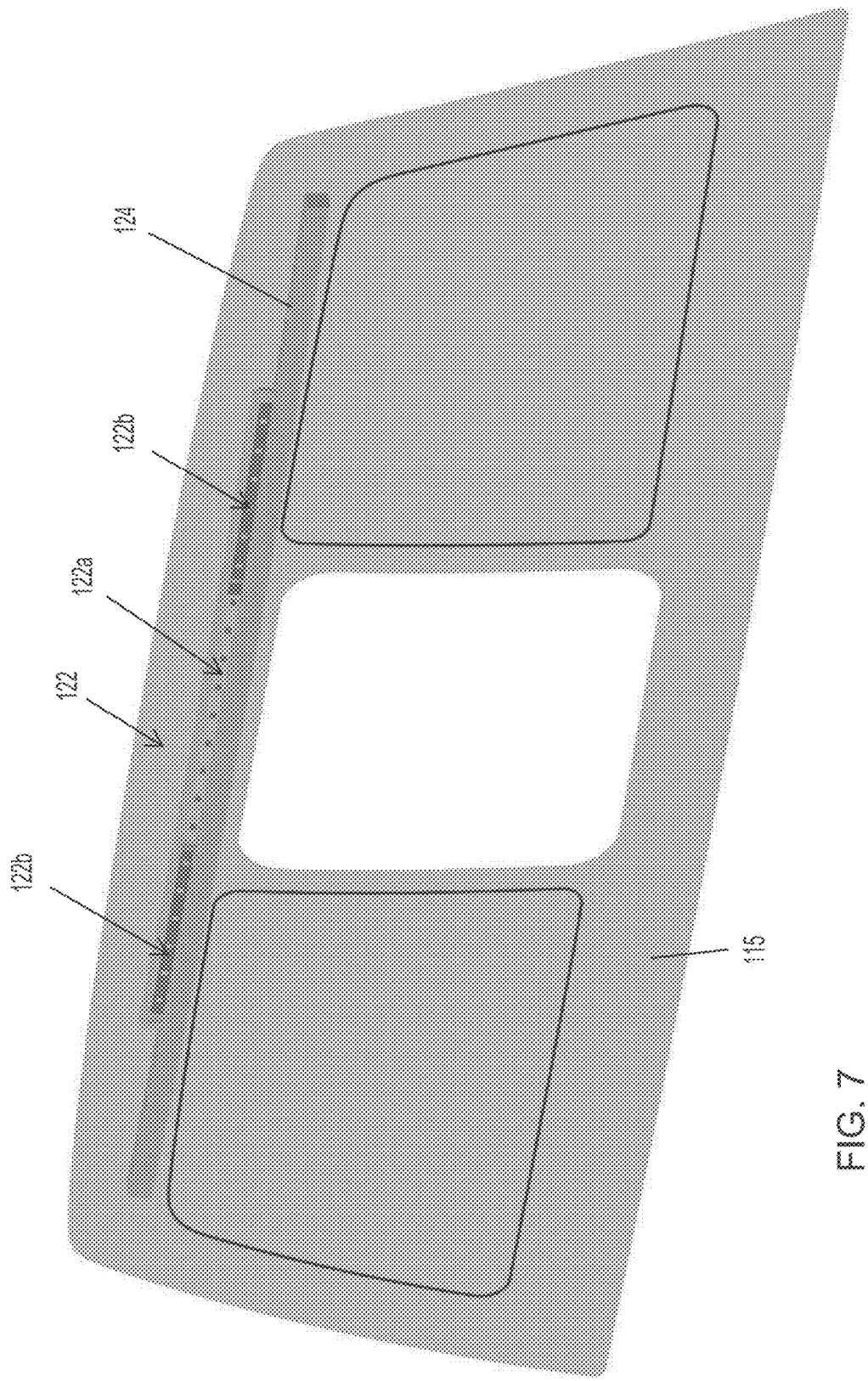
FIGS. 7 and 8 are rear perspective views of a fixed window panel and lighting device of another rear slider window assembly of the present invention.
Figure 8:
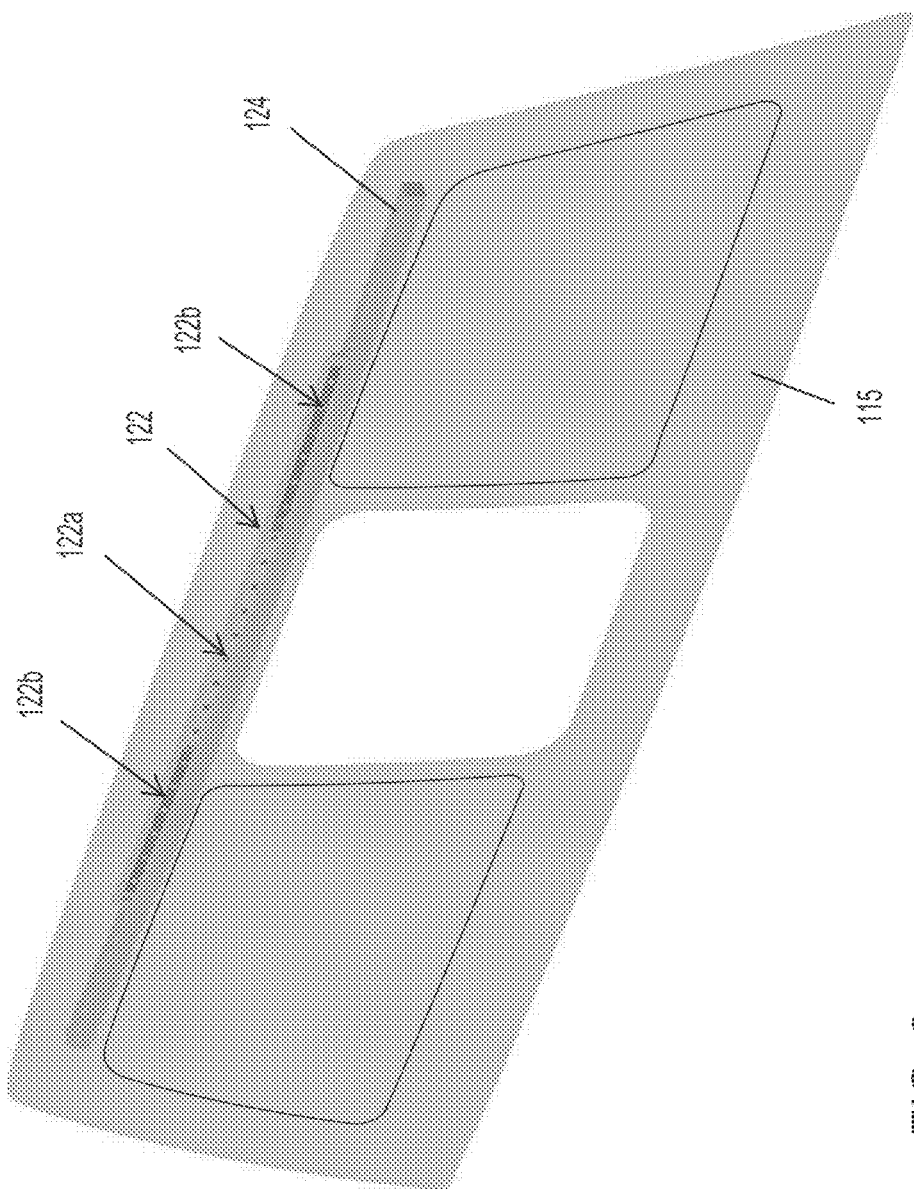
Figure 9:
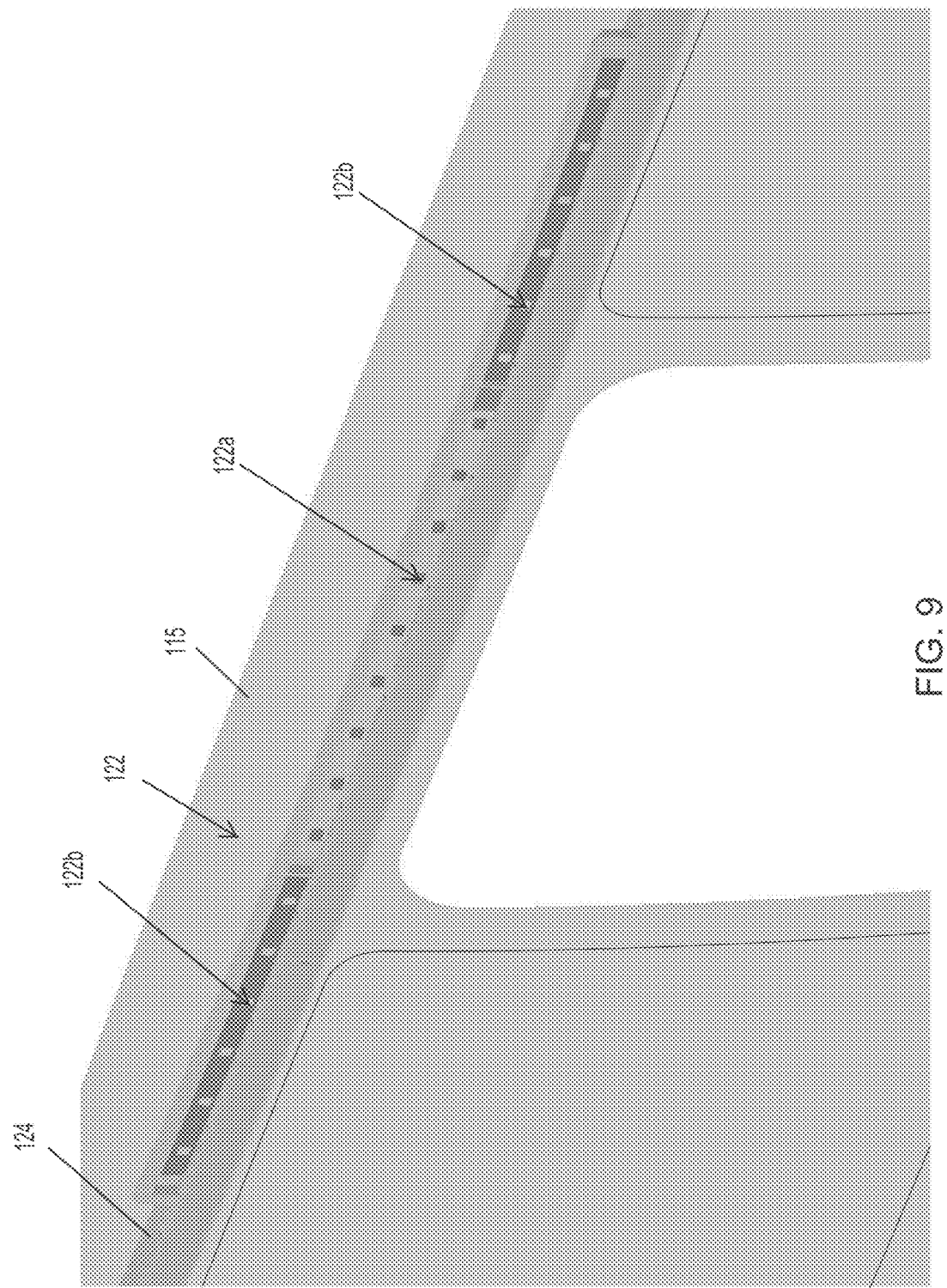
FIG. 9 is an enlarged perspective view of the lighting device of FIGS. 7 and 8.
Figure 10:
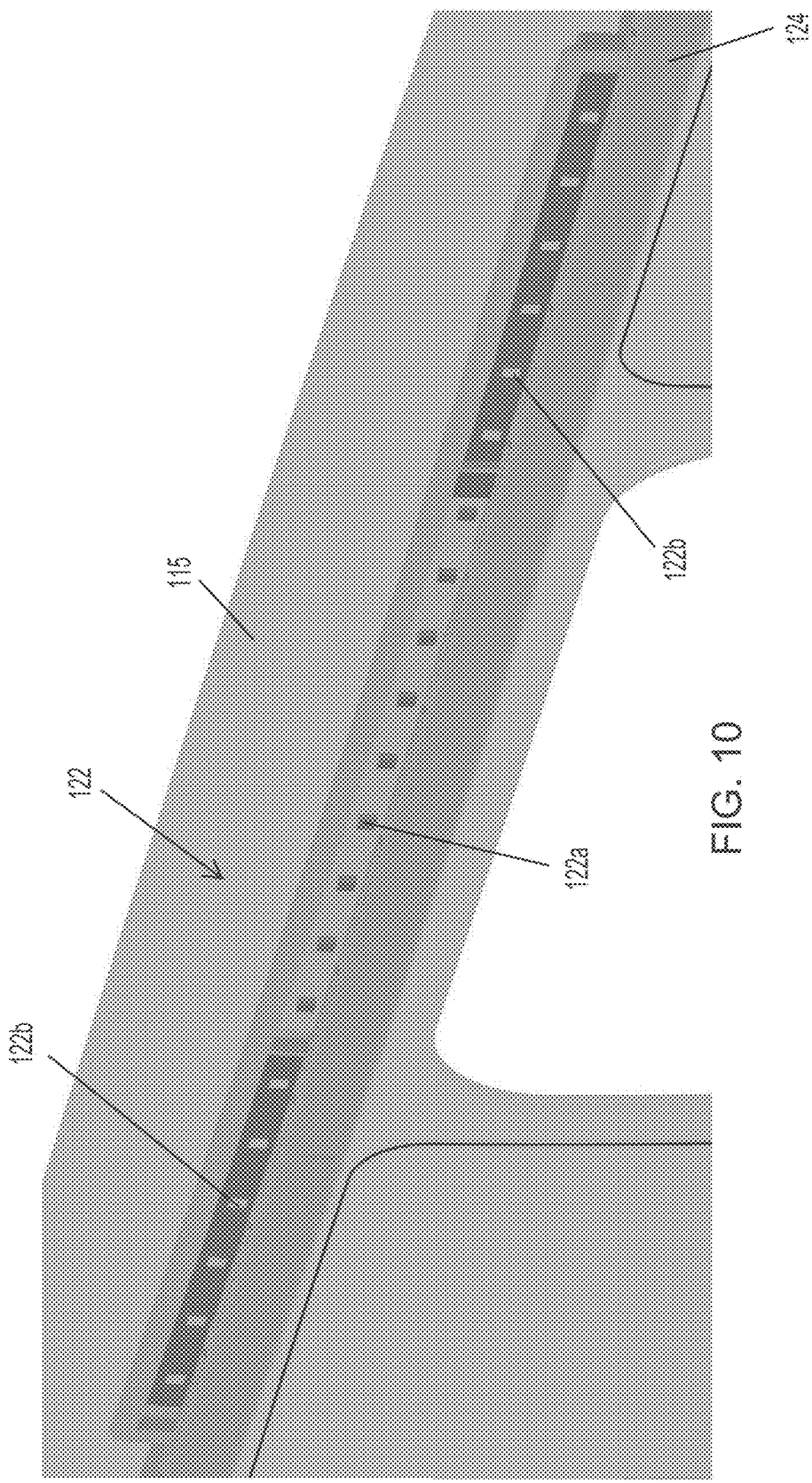
FIG. 10 is an enlarged perspective view of the lighting device of FIG. 9.
Figure 11:
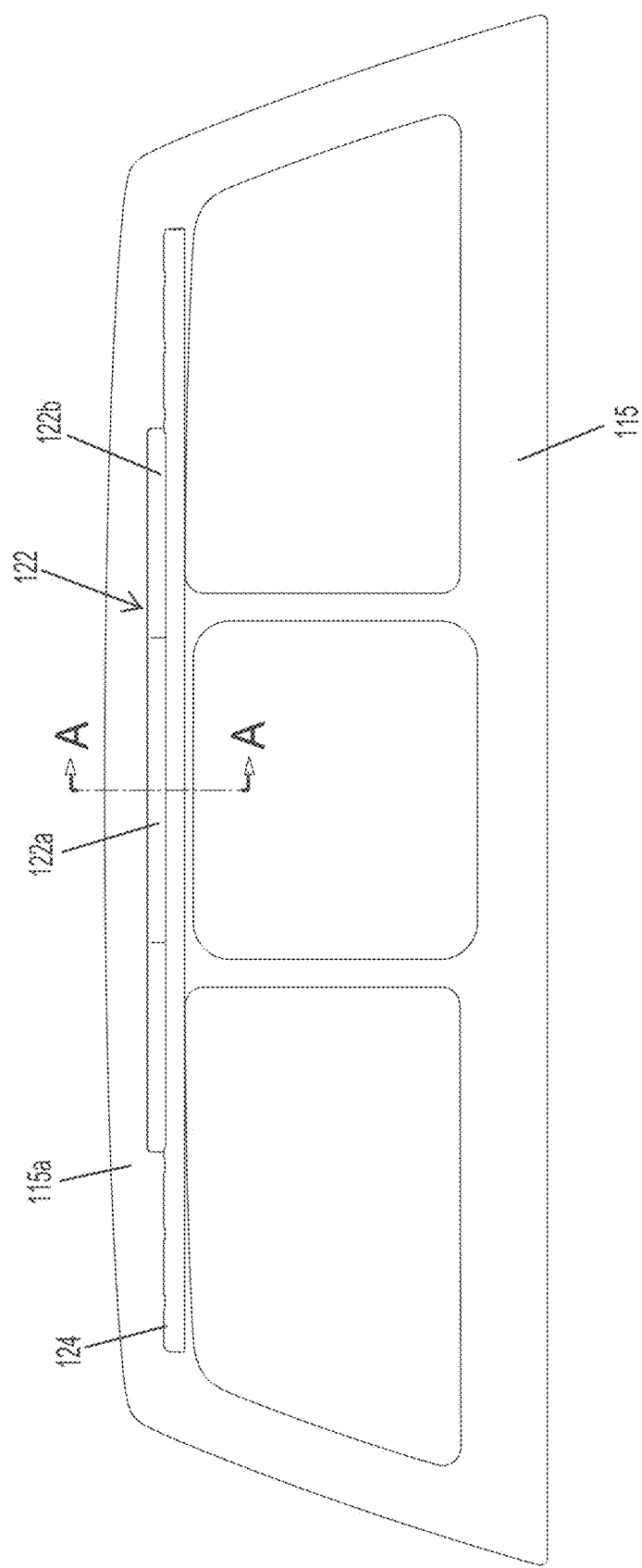
FIG. 11 is a front plan view of the fixed window panel and lighting device of the present invention.
Figure 12:
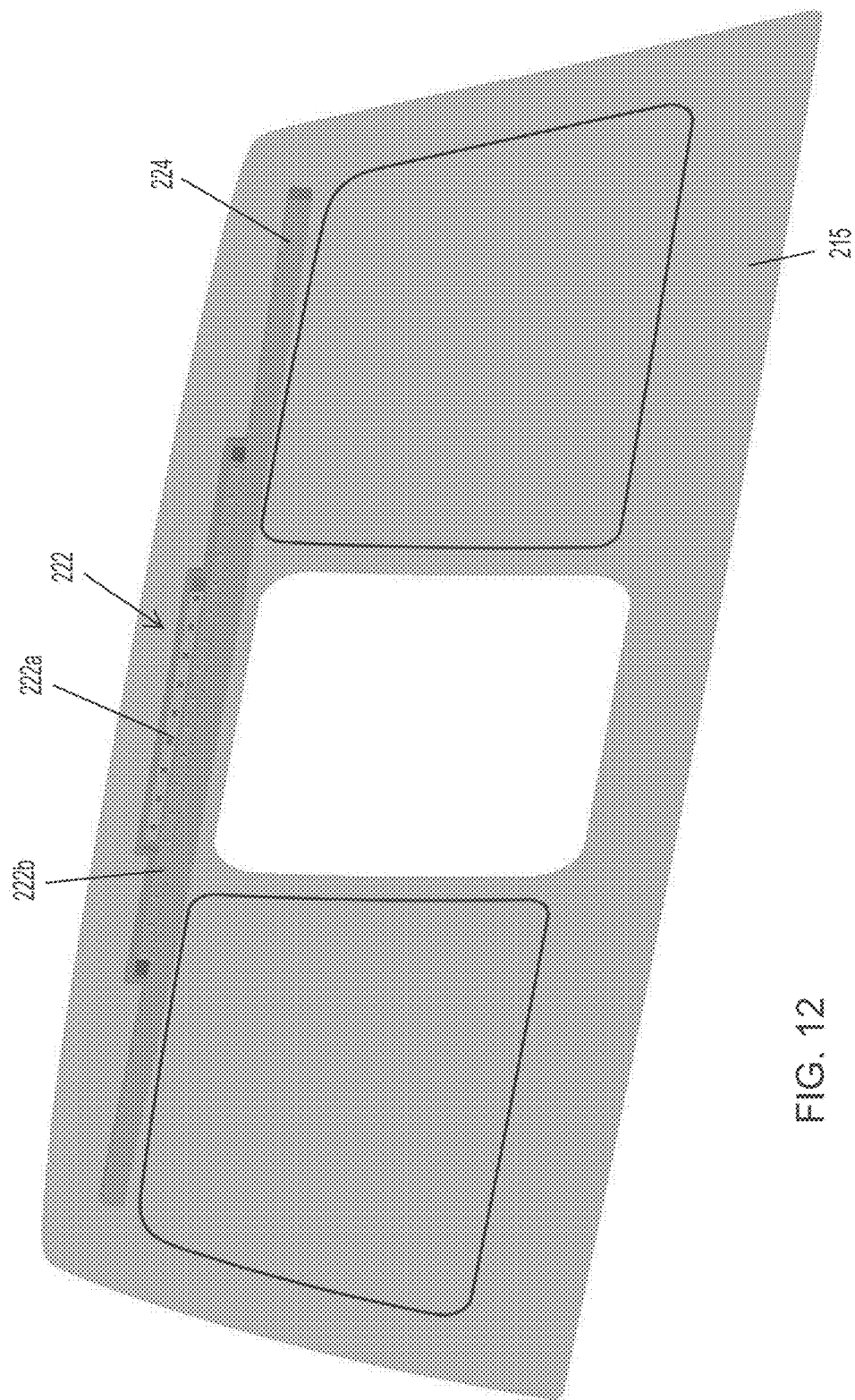
FIG. 12 is a rear perspective view of a fixed window panel and lighting device of another rear slider window assembly of the present invention.
Figure 13:
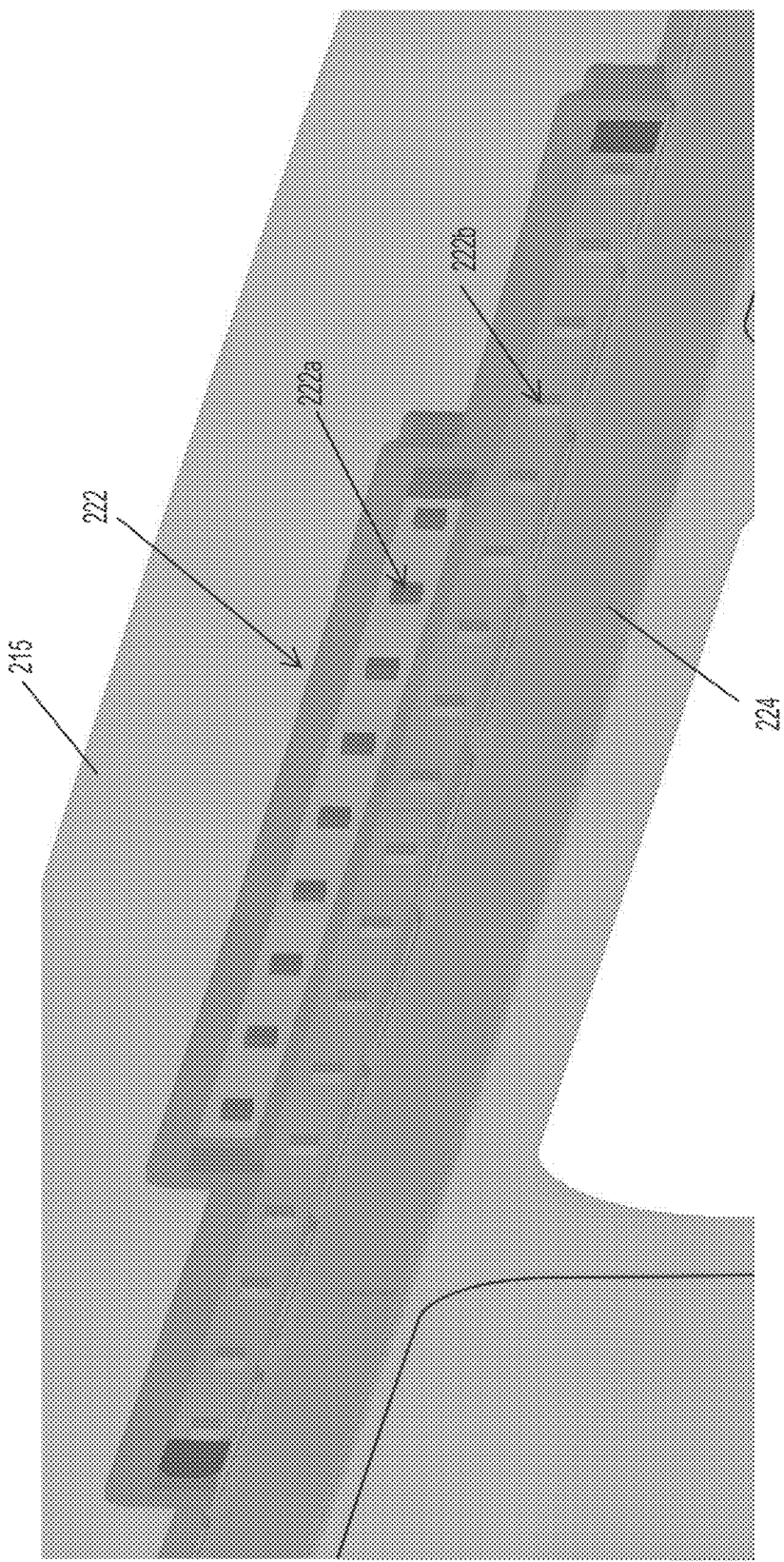
FIG. 13 is an enlarged perspective view of the lighting device of FIGS. 7 and 8.
Figure 14:
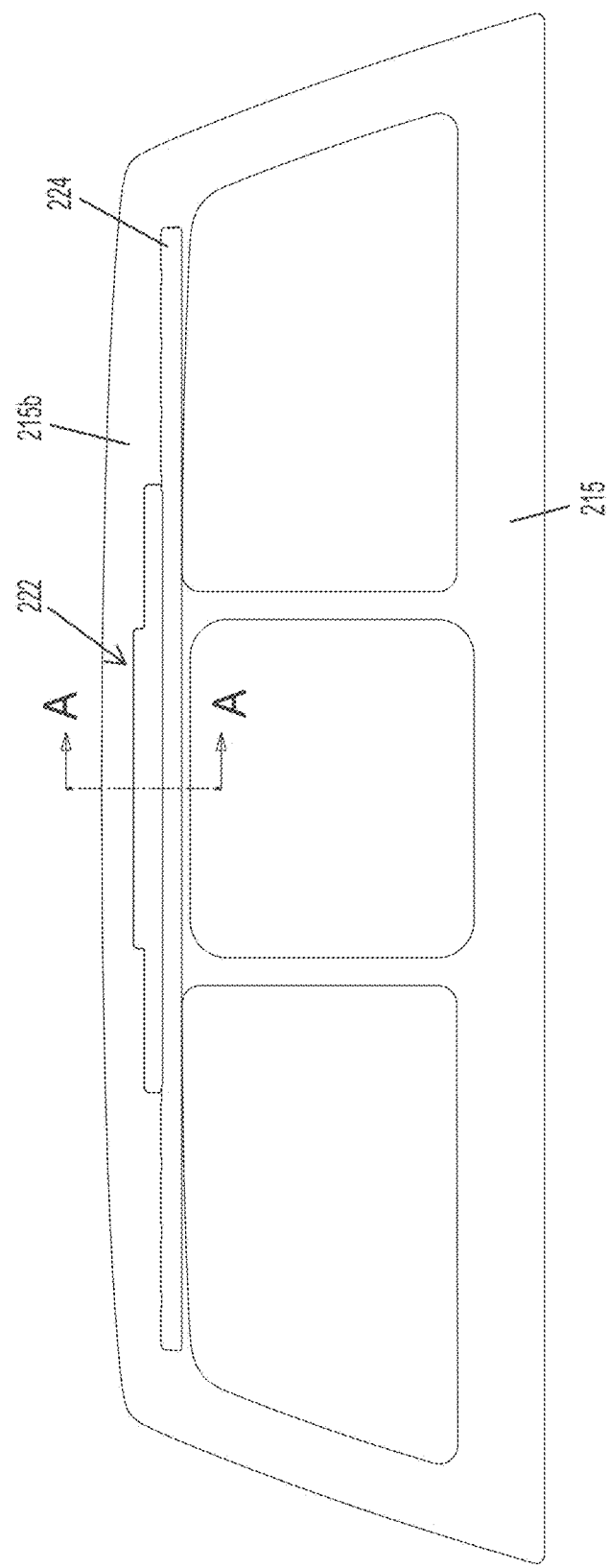
FIG. 14 is a front plan view of the fixed window panel and lighting device of the present invention.
Figure 15:
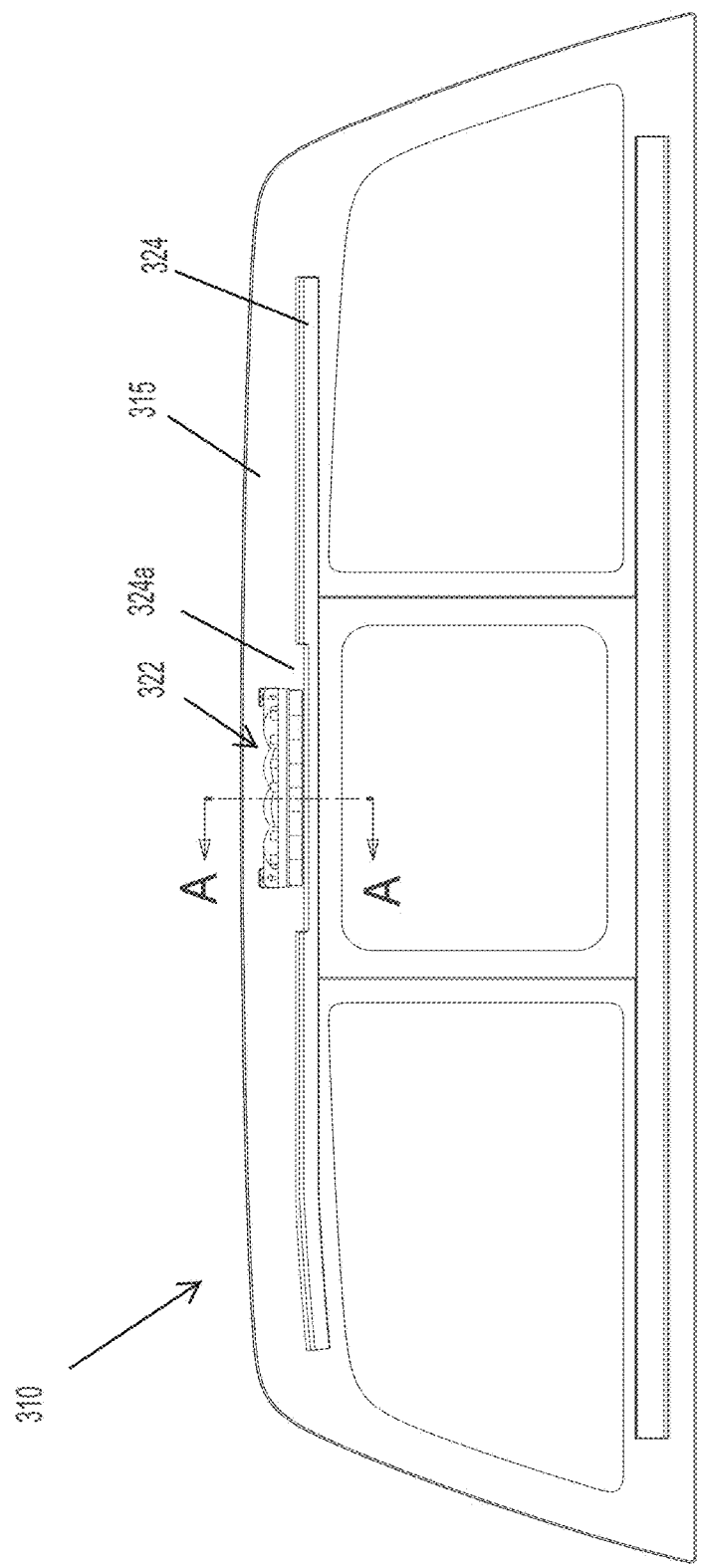
FIG. 15 is a plan view of another rear slider window assembly with a lighting device of the present invention.
Figure 16:
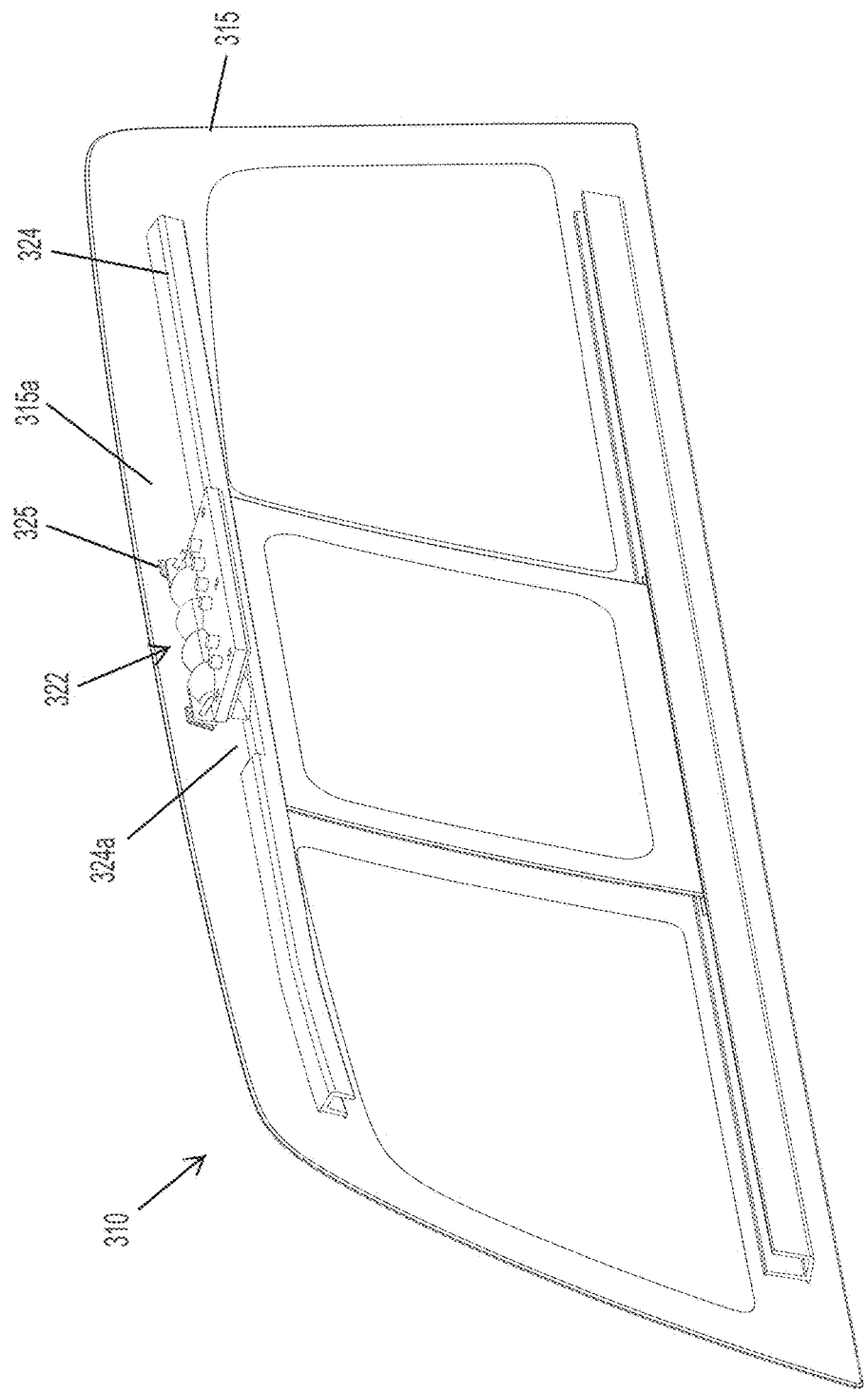
FIG. 16 is a perspective view of the rear slider window assembly and lighting device of FIG. 15.

Referring now to the drawings and the illustrative embodiments depicted therein, a rear slider window assembly 10 of a vehicle 12 (such as a pickup truck or the like) includes a window frame 14, a fixed window panel 15 having an aperture 15a that separates side window portions 16, 18 and a movable window panel 20 that is movable relative to frame 14 and fixed window panel between an opened position and a closed position (FIGS. 1-3). The window assembly 10 includes a lighting system having a lighting device 22 disposed behind the glass window panel 15 and above and along a center region of an upper rail 24 of frame 14. The lighting device 22, when activated, illuminates light that is viewable through the window panel 15. The lighting device may comprise a center high mounted stop lamp for the vehicle whereby the lighting system may actuate the lighting device as part of a brake light system of the vehicle or the lighting device may comprise a plurality of white light emitting lights whereby the lighting system may actuate the lighting device as part of a truck bed illumination system or the like, as discussed below. The lighting device is disposed behind the glass panel 15 and emits light that passes through the glass panel, such as through a darkened portion of the panel or through apertures or windows formed through a darkened portion of the panel or the like, as also discussed below.

In the illustrated embodiment, the window assembly 10 comprises a hole-in-glass window configuration, where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening therebetween. The fixed window panels may comprise two separate spaced apart fixed window panels that define the opening therebetween (and with upper and lower appliqués or trim or filler panels or elements disposed at the upper and lower regions of the opening and between the fixed window panels, and thus with the lighting device disposed behind the upper appliqué or the like), while remaining within the spirit and scope of the present invention.

Frame 14 comprises an upper rail 22 and a lower rail, with the upper and lower edge regions of movable window panel 20 movably or slidably received in and along the respective upper and lower rails. Slider or movable window panel 20 is movable along the lower rail and upper rail of frame portion 14 to open and close the aperture or opening, such as in a manner similar to known slider window assemblies. Slider window panel 20 may be disposed at a lower carrier, which may receive the lower perimeter edge region of the slider window panel 20 therein and may be slidably or movably received in the channel portion of the lower rail of frame portion 14. The upper rail may comprise any suitable channel or rail element configured to slidably receive an upper edge portion of the movable window panel, and upper rail 22 may comprise a unitarily formed upper rail or channel.

As shown in FIGS. 2-6A, lighting device 22 is disposed at the inner surface 15b of the fixed panel 15 and above and partially along the upper rail 24. The lighting device 22 includes a housing portion 22a that may be disposed at and adhered to the inner surface 15b of the fixed panel 15, whereby the light sources 22b, when actuated or energized, emit light through the window panel so as to be viewable to a person viewing the vehicle from behind the vehicle. The housing is configured to have a flange or portion that attaches or adheres at the inner surface of the window panel and a lower portion that may abut against and along an upper portion of the upper rail or channel. The housing substantially encases the light sources in a cavity defined at the housing and window panel such that light emitted by the light sources passes through the window panel and is not viewable through the housing and inside the vehicle cabin. The light sources may emit sufficient light so as to be viewable through an opaque or semi-opaque layer at the window panel or the light sources may be disposed at and generally aligned with apertures through the opaque or semi-opaque layer at the window panel, such that the light emitted by the light sources of the lighting device passes through the fixed window panel so as to be readily viewable by a person viewing the exterior of the window assembly from exterior and rearward of the vehicle.

In the illustrated embodiment, lighting device 22 comprises a strip of a plurality of light sources 22b (such as a plurality of light emitting diodes (LEDs) arranged along a strip or circuit element 22c that extends along and above the aperture 15a of the fixed panel 15). For example, the light sources 22b may comprise red light-emitting LEDs (or the light sources may be white light-emitting LEDs and the inner surface of the housing and circuit element may be red colored so as to provide red illumination) such that the lighting device 22 comprises a center high mounted stop lamp and is actuated with the brake lights of the vehicle.

The light sources of the lighting device may be electrically connected to a wiring harness of the vehicle and/or circuitry of the vehicle (such as brake light wiring or circuitry and/or such as a user input and a power source and/or the like) via any suitable means. For example, the light sources may electrically connect to a connector and electrically conductive trace established at the inner surface of the fixed window panel, whereby a wiring harness or wire of the vehicle may electrically connect to the connector at the window panel. Optionally, the light sources may electrically connect to a conductive trace or busbar that extends along the fixed window panel to a connector at a side or lower region of the window assembly, whereby a wiring harness may connect to the connector and to connectors for a heater grid of the window assembly at a common connecting area of the window assembly. Optionally, the lighting device may include a wire or lead that extends from the device and may be routed along or behind the upper rail for electrical connection to a wiring harness or wire of the vehicle. Clearly, other means for electrically connecting the light sources to a wiring harness or circuitry of the vehicle may be implemented while remaining within the spirit and scope of the present invention.

Optionally, the lighting device may provide both a brake light function and a truck bed illumination function. For example, and with reference to FIGS. 7-11A, a lighting device 122 may be disposed at the inner surface 115b of the fixed window panel 115 and may extend along the upper rail 124, with the lighting device having a plurality of light sources 122a (such as red light-emitting LEDs or the like) at a center region of the window assembly 110 and a plurality of light sources 122b (such as white light-emitting LEDs or the like) at the side regions of the window assembly 110. The lighting device thus may have the center or red lights electrically connected to the brake light circuitry and the side or white lights electrically connected to a user input in the cabin of the vehicle or at the window assembly, whereby actuation of the user input actuates the side lights for illuminating the truck bed (with the side lights directing illumination rearward of the cab of the vehicle and preferably downward so as to illuminate the truck bed). The lighting device 122 may otherwise be substantially similar to the lighting device 22, discussed above, such that a detailed discussion of the lighting devices need not be repeated herein.

Optionally, for example, and with reference to FIGS. 12-14A, a lighting device 222 may be disposed at the inner surface 215b of the fixed window panel and may extend along the upper rail 224, with the lighting device having two rows of light sources, such as a plurality of light sources 222a (such as red light-emitting LEDs or the like) at an upper center region of the window assembly 210 and a plurality of light sources 222b (such as white light-emitting LEDs or the like) below the light sources 222a and also at an upper center region of the window assembly 210. The lighting device thus may have the upper or red lights electrically connected to the brake light circuitry and the lower or white lights electrically connected to a user input in the cabin of the vehicle or at the window assembly, whereby actuation of the user input actuates the side lights for illuminating the truck bed. The lighting device 222 may otherwise be substantially similar to the lighting devices 22, 122, discussed above, such that a detailed discussion of the lighting devices need not be repeated herein.

Figure 17:
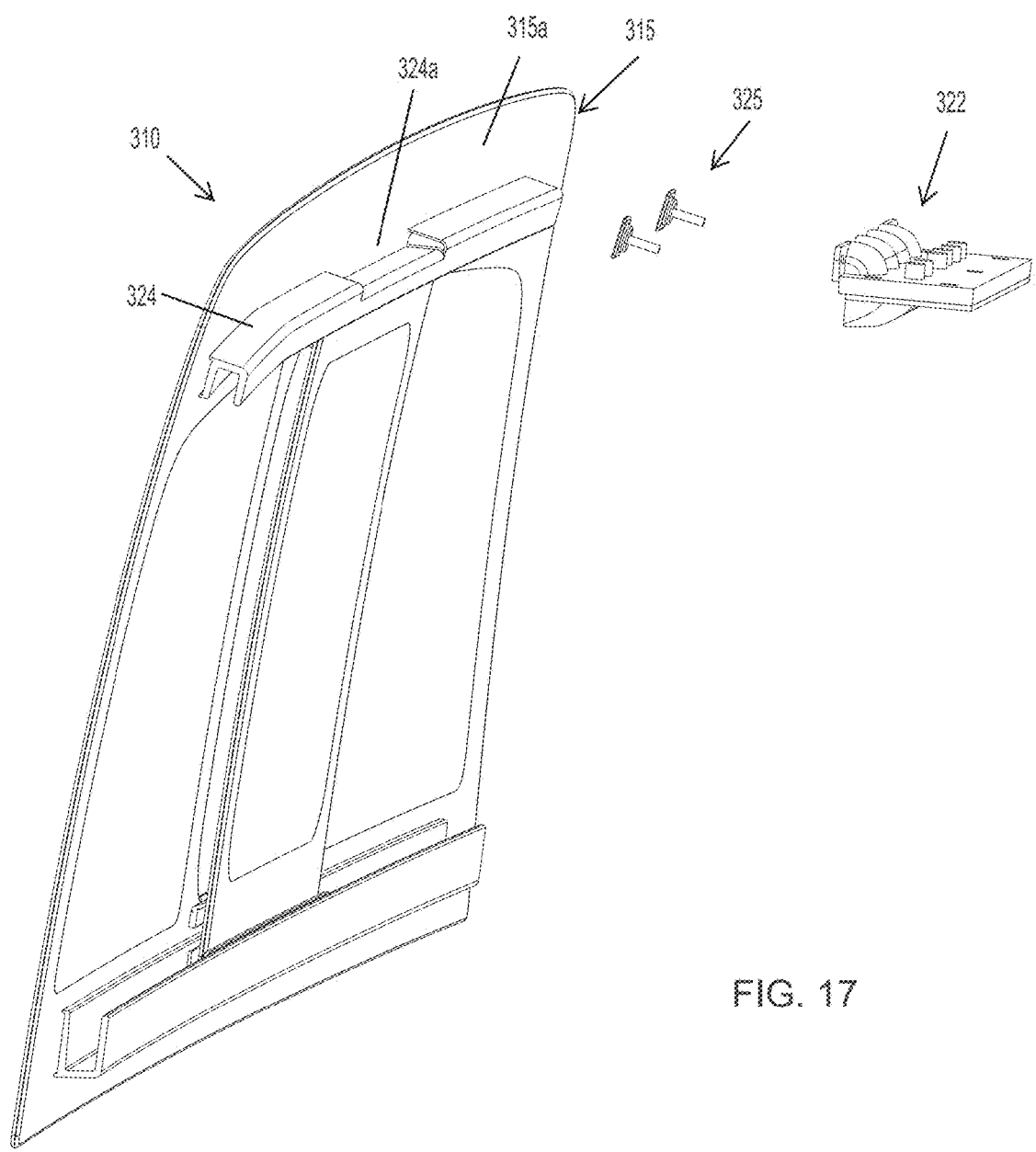
FIG. 17 is an exploded perspective view of the rear slider window assembly and lighting device of FIGS. 15 and 16.
Figure 18:
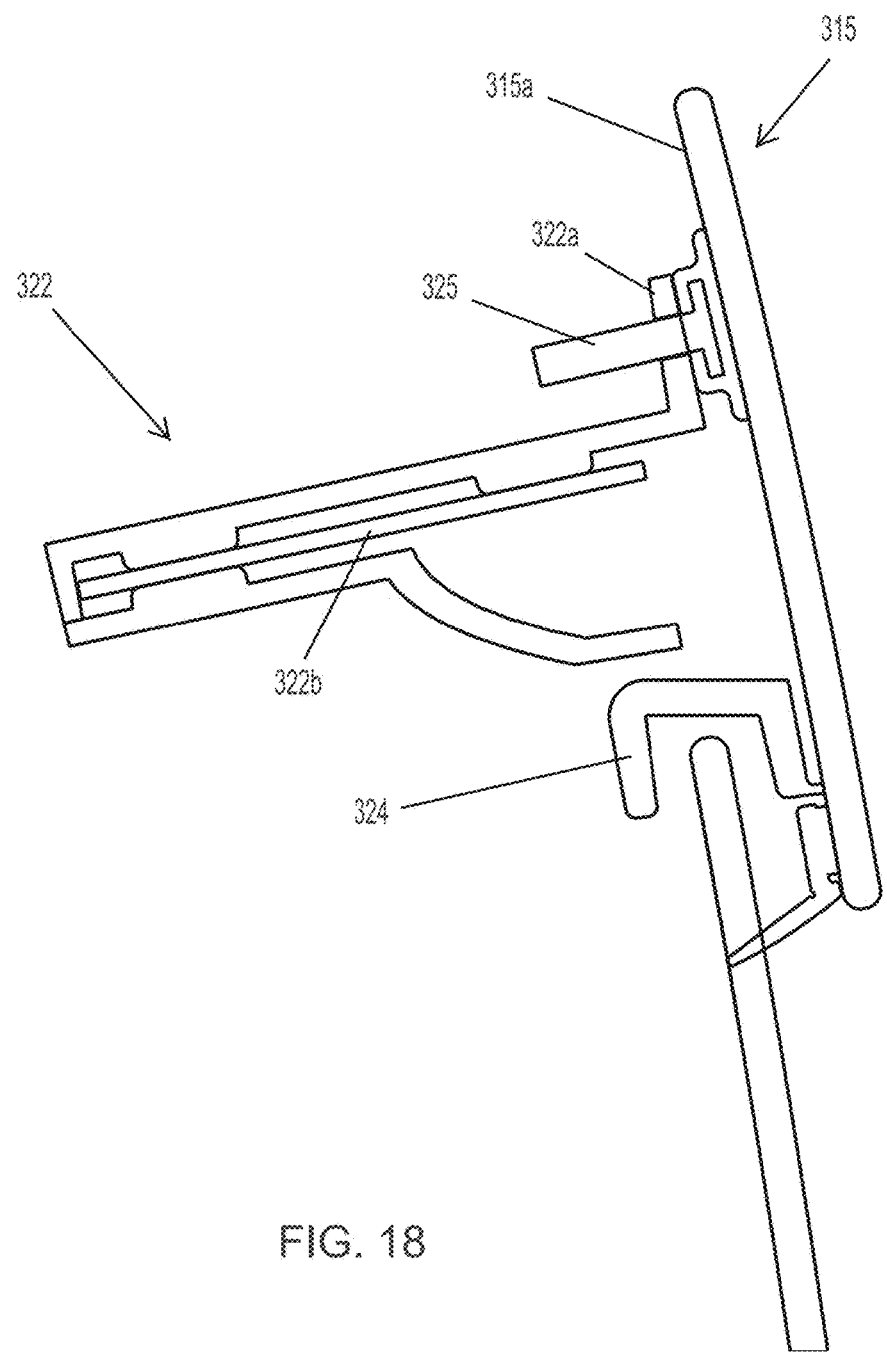
FIG. 18 is a sectional view of the taken along the line A-A in FIG. 15.

Optionally, for example, and with reference to FIGS. 15-20, a lighting device 322 may be disposed at the inner surface 315a of the fixed window panel 315 of a window assembly 310 and may extend along a recess 324a established at the upper rail 324, with the lighting device attaching to one or more mounting elements or posts 325 adhesively bonded at the inner surface 315a of the window panel 315. In the illustrated embodiment, and as best shown in FIGS. 17 and 18, the posts 325 are adhesively bonded at the window surface 315a and are received through a mounting flange 322a (such as through apertures or slots established through the mounting flange) of the lighting device 322, such that the window assembly may have the posts adhered or bonded to the window panel during one assembly step, whereby the lighting device may be readily mounted at the posts during a subsequent assembly step or process, such as via pressing the lighting device onto the posts with no further fasteners required. The lighting device may then be electrically connected to a wiring harness at the vehicle to power and/or control the illumination sources of the lighting device 322 (such as illumination sources or LEDs for a brake light function and/or illumination sources or LEDs for a rear truck bed illumination function or the like). When mounted at the posts 325, the lighting device or module 322 may be spaced from the upper rail 324 or may rest at the upper rail, with no further attachment to the upper rail being necessary to hold or secure the lighting device at the window panel.

Figure 19:
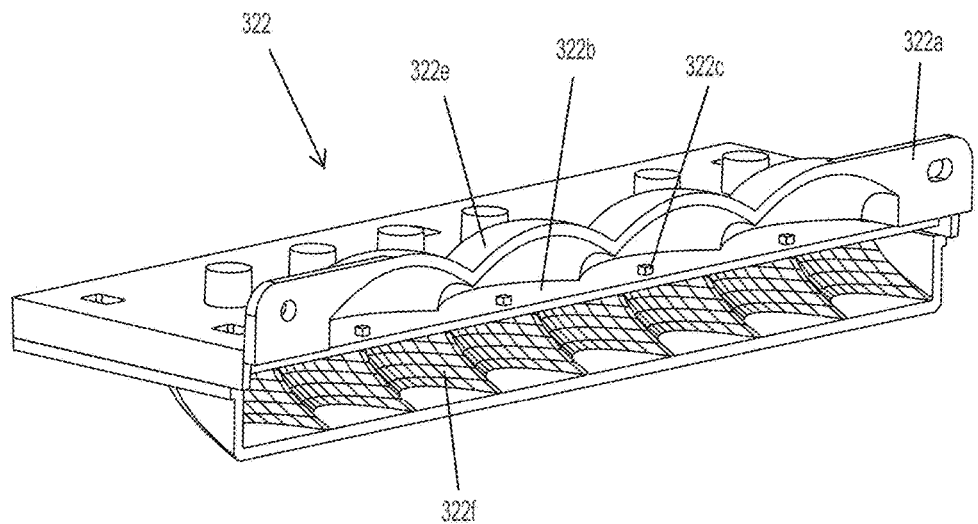
FIGS. 19 and 20 are perspective views of the lighting device of FIGS. 15-17.
Figure 20:
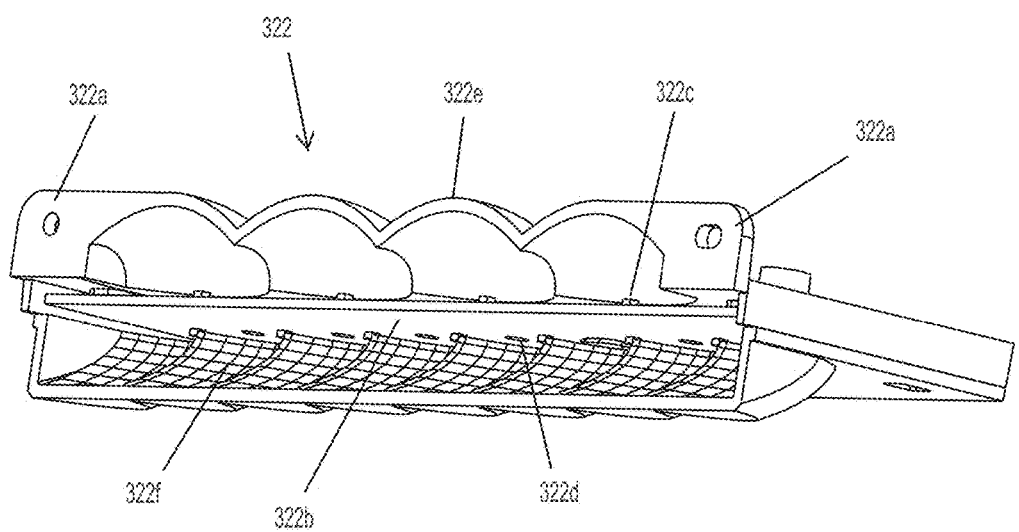
Figure 21:
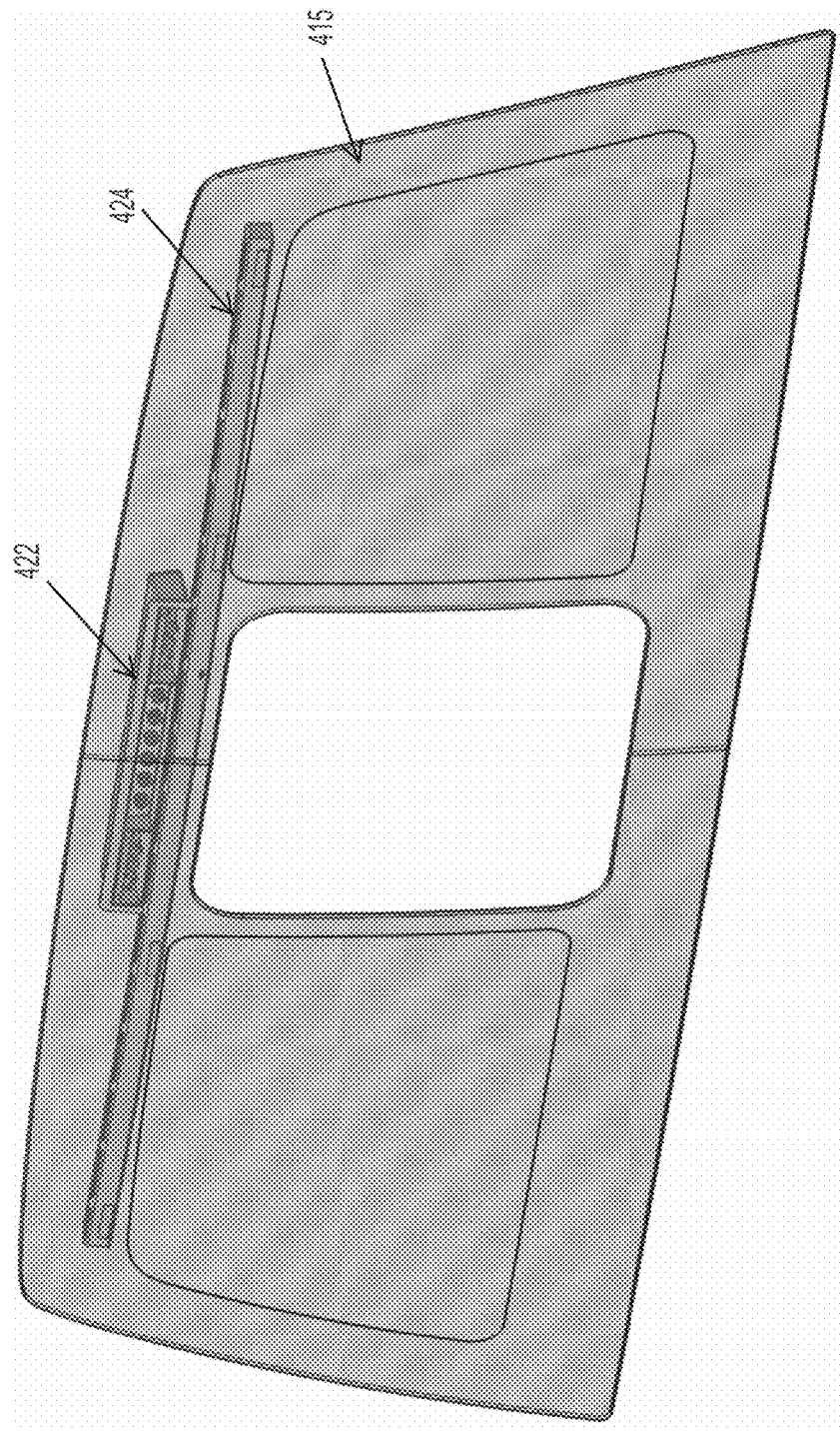
FIG. 21 is a perspective view of another rear window assembly having a lighting device in accordance with the present invention.
Figure 22:
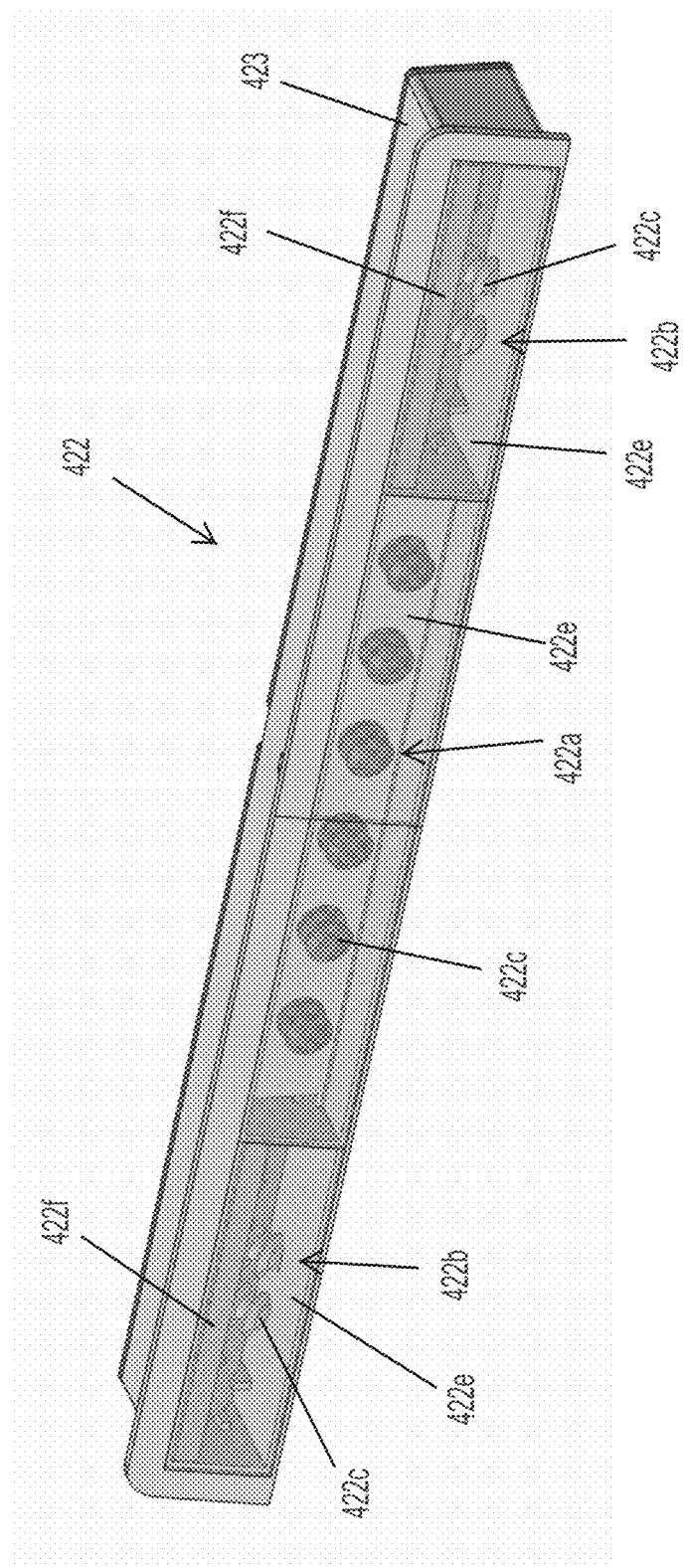
FIG. 22 is a perspective view of the lighting device of FIG. 21.

In the illustrated embodiment, and as best shown in FIGS. 18-20, the lighting device 322 includes a circuit board 322b disposed therein, with a row of illumination sources 322c along an upper portion of the circuit board and a row of illumination sources 322d along a lower portion of the circuit board. The housing of the illumination source includes an upper reflector portion 322e disposed over the upper illumination sources 322c and a lower reflector portion 322f disposed under the lower illumination sources 322d. Thus, the reflectors may be formed to provide the desired illumination function of the respective illumination sources. For example, the upper reflector portion 322e may be formed (so as to have, for example, partial spherical or curved reflective surfaces that reflect light emitted by respective illumination sources or LEDs rearward and downward) to reflect light emitted by illumination sources 322c rearward and downward into the truck bed for a truck bed illumination function, while the lower reflector portion 322f may be formed (so as to have, for example, curved reflective surfaces that reflect light emitted by respective illumination sources or LEDs generally rearward and not downward) to reflect light emitted by illumination sources 322d rearward of the vehicle for a brake light function. The LEDs and/or the reflectors may also be configured to provide the desired color of light for the respective functions (such as white light for the truck bed illumination function and red light for the brake light function).

After attachment at the posts or mounting elements 325, the lighting device may electrically connect to a wiring harness of the vehicle or to wiring or circuitry associated with the window assembly to power and control the illumination sources. For example, the lower illumination sources or LEDs may be electrically connected to the brake light circuitry and the upper illumination sources or LEDs may be electrically connected to a user input in the cabin of the vehicle or at the window assembly (such as a user input or sensor that is disposed at the window panel and is in electrical communication with the circuitry of the lighting device via wiring or electrically conductive traces at the window panel), whereby actuation of the user input actuates the upper lights for illuminating the truck bed (in an embodiment where the user input is at and part of the window assembly, the lighting device may only be electrically connected to a power source, or may have its own power source or battery, with the circuitry and user inputs and lights being integrated with the lighting device and/or window assembly). The lighting device 322 thus provides a modular lighting device that may be selected or configured to provide the desired lighting function or functions, whereby the selected module is readily mounted to mounting elements or posts at the window panel and readily electrically connected to the appropriate wiring harness or circuitry at the vehicle. The lighting device 322 may otherwise be substantially similar to the lighting devices 22, 122, 222 discussed above, such that a detailed discussion of the lighting devices need not be repeated herein.

Optionally, the lighting device of the present invention may comprise a central portion that includes a plurality of red light emitting light sources that emit light generally rearward of the vehicle, and opposite side portions that include a plurality of white light emitting lights sources that emit light generally downwardly and rearward of the window assembly so as to illuminate a truck bed of the vehicle. For example, and with reference to FIGS. 21-28, a lighting device 422 may be disposed at the inner surface 415b of the fixed window panel 415 and may extend along the upper rail 424, with the lighting device having a plurality of light sources 422a (such as red light-emitting LEDs or the like) at a center region of the window assembly and a plurality of light sources 422b (such as white light-emitting LEDs or the like) at the side regions of the window assembly. The lighting device thus may have the center or red light sources electrically connected to the brake light circuitry and the side or white light sources electrically connected to a user input in the cabin of the vehicle or at the window assembly, whereby actuation of the user input actuates the side lights for illuminating the truck bed. The lighting device 422 may otherwise be substantially similar to the lighting devices 22, 122, 222 and 322, discussed above, such that a detailed discussion of the lighting devices need not be repeated herein.

Figure 23:
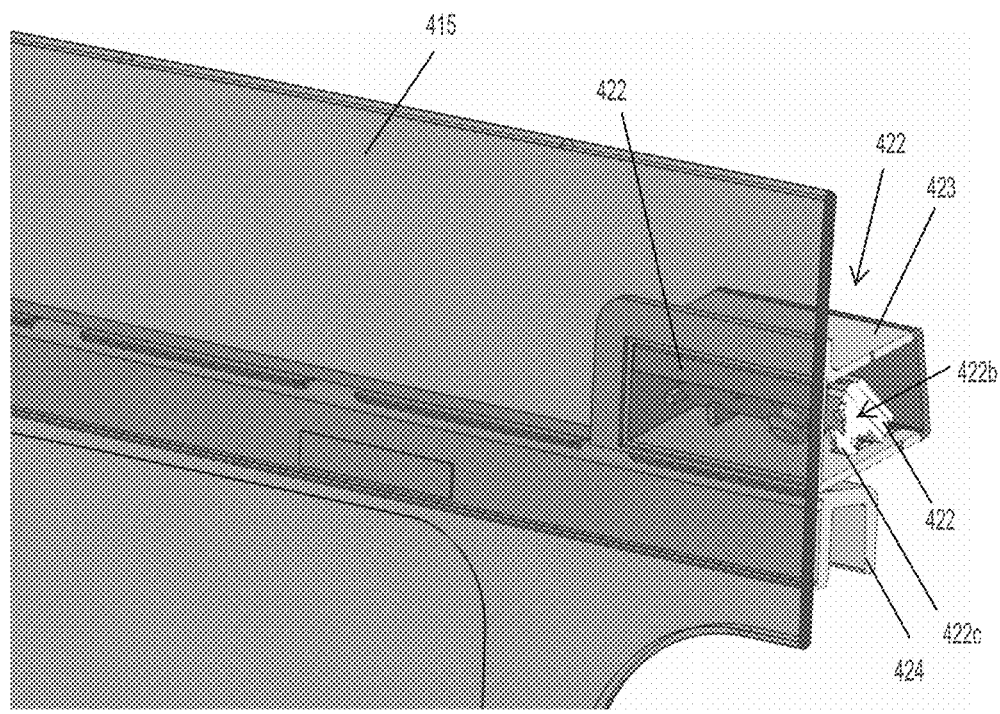
FIG. 23 is a perspective and partial sectional view of a truck bed lighting portion of the lighting device and window assembly of FIG. 21.
Figure 24:
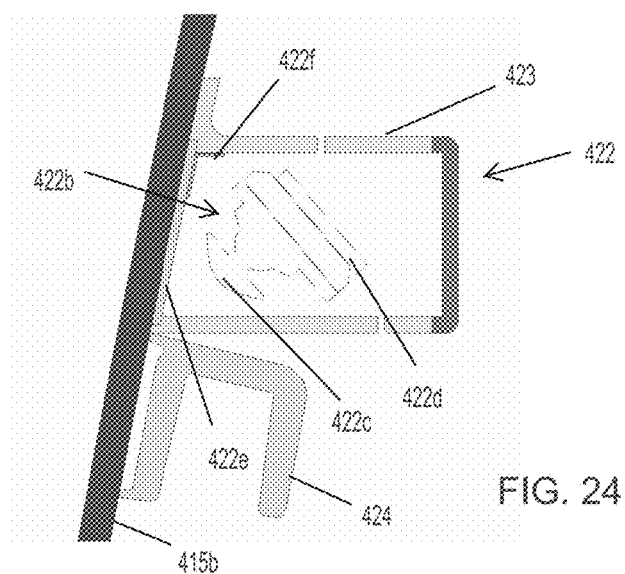
FIG. 24 is a sectional view of the truck bed lighting portion of the lighting device and window assembly of FIG. 23.

In the illustrated embodiment, the white light sources 422b are angled downwardly (such as about 45 degrees or thereabouts) relative to the generally vertical glass window panel 415 at which the lighting device 422 is attached. Optionally, and such as shown in FIGS. 23 and 24, the light sources or light emitting diodes 422b include a lens element 422c disposed at the respective light source 422b and at the angled circuit board or substrate 422d, with the circuit board 422d mounted at the housing 423 of the lighting device at the desired angle such that illumination emitted by the light sources 422b is directed generally downwardly towards the truck bed. The circuit board includes circuitry electrically connected to the light sources 422b and to an electrical connector of the lighting device, such that when the window assembly and lighting device are installed in a vehicle, the electrical connector is connected to a wiring harness or connector of the vehicle to provide power and control to the light sources.

As shown in FIG. 24, the lighting device includes a cover or lens 422e at the rear opening of the housing 423, such that the housing may be closed and sealed before attachment at the window panel. When attached at the window panel, the cover 422e (which may comprise a transparent and/or holographic or diffusing cover to disperse the light in a generally uniform manner) is disposed at and along the inner surface of the window panel. Optionally, a reflector or reflective strip 422f is disposed at an upper corner region of the housing and cover to limit stray light from projecting upward and rearward and to enhance the downward illumination of the truck bed when light sources 422b are activated.

Figure 25:
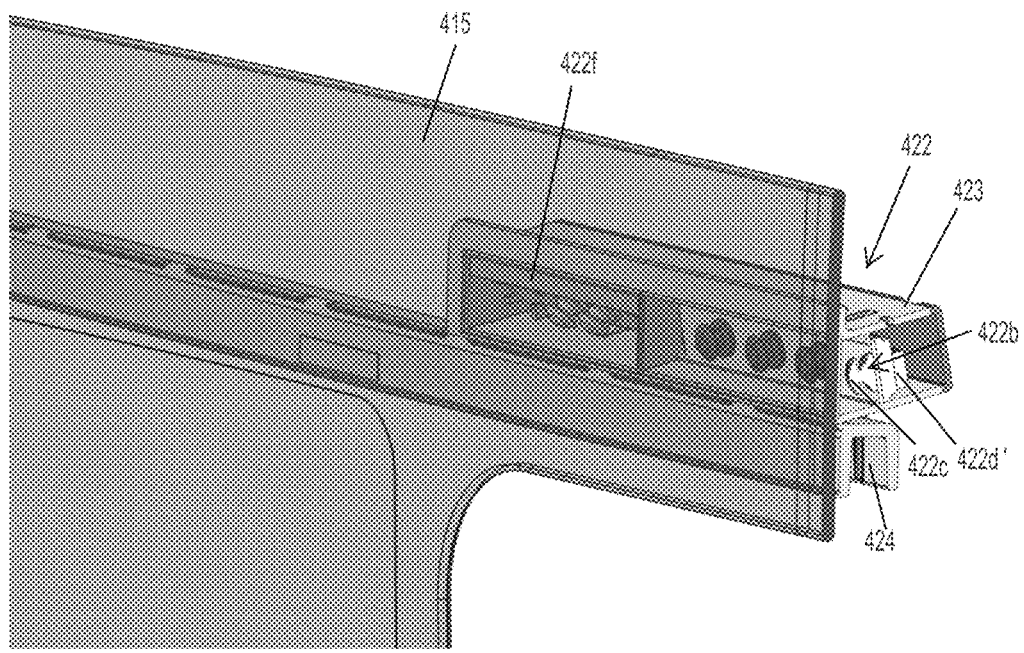
FIG. 25 is a perspective and partial sectional view of a stop lamp portion of the lighting device and window assembly of FIG. 21.
Figure 26:
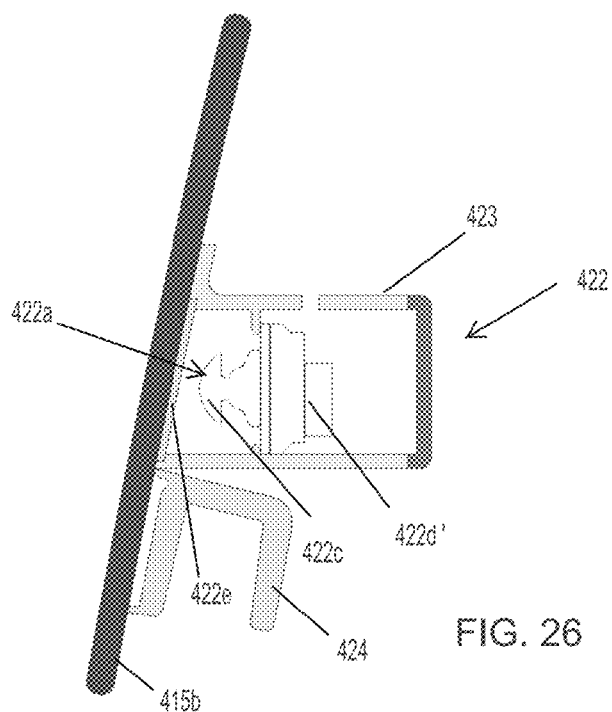
FIG. 26 is a sectional view of the stop lamp portion of the lighting device and window assembly of FIG. 25.
Figure 27:
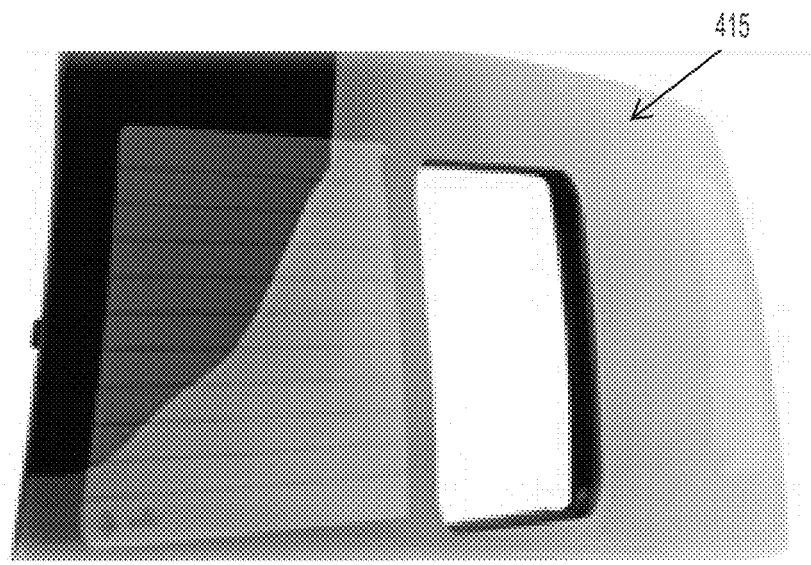
FIG. 27 is a perspective view of the window assembly of the present invention, with the lighting device deactivated and not readily viewable through the glass window panel.
Figure 28:
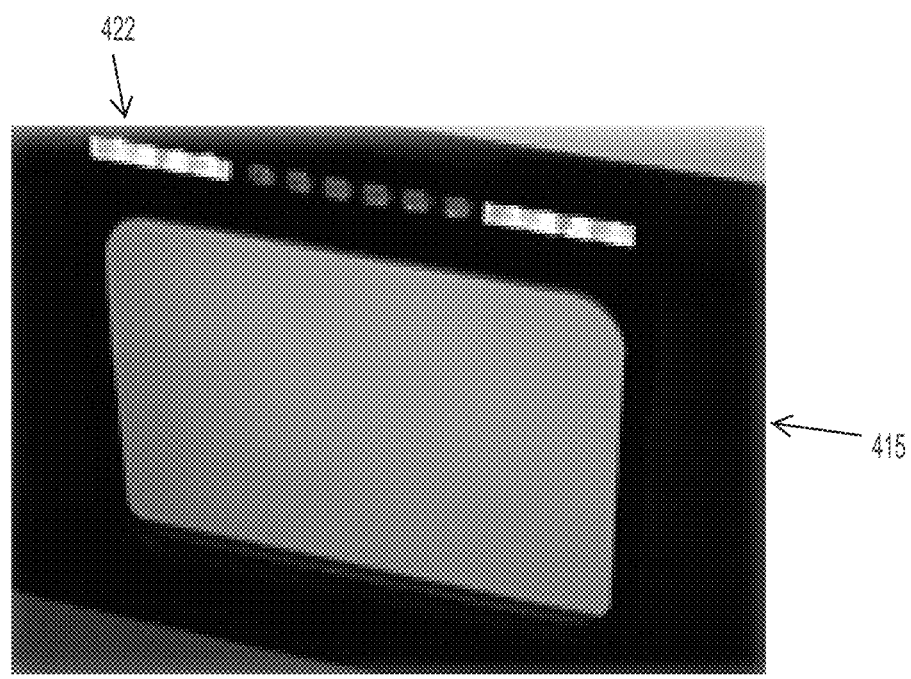
FIG. 28 is another perspective view of the window assembly of FIG. 27, with the lighting device activated so as to emit light through the glass window panel.

As can be seen with reference to FIGS. 25 and 26, center light sources 422a are attached at or disposed at a circuit board 422d' that is not angled such that the light sources 422a (having respective lenses or lens elements 422c) are directed generally rearwardly. The center region of the lighting device also includes the cover element 422e, but does not include a reflector (such as the reflector 422f), such that light emitted by the red light sources 422a can project rearwardly of the vehicle so as to be viewed by drivers of other vehicles following the vehicle equipped with the window assembly of the present invention. The circuit board includes circuitry electrically connected to the light sources 422a and to an electrical connector of the lighting device, such that when the window assembly and lighting device are installed in a vehicle, the electrical connector is connected to a wiring harness or connector of the vehicle to provide power and control to the light sources. Optionally, and desirably, the circuit boards 422d, 422d' are electrically connected together such that the light sources 422a, 422b are electrically connected to a single electrical connector (such as a multi-pin plug or socket connector) that connects to a multi-pin connector of the vehicle, whereby electrical power and both brake light control signals and user input control signals are provided to the lighting device via single electrical connector.

The combination of the angled circuit boards, spherical lenses at the LEDs and the holographic cover element allows for reduced vertical packaging height of the lighting device. Thus, the lighting device of the present invention may be disposed at an upper region of the window panel so as to not interfere with the design of the sheet metal of the vehicle cab, such that recesses or impressions are not needed in the sheet metal to accommodate the lighting device when the window panel is installed at the vehicle.

The lighting device may be bonded at the inner surface of the glass window panel (such as shown in FIGS. 23-26) or may be molded as part of the rail 424 or may be attached at the rail 424. Optionally, the lighting device may be attached to one or more brackets bonded or otherwise affixed at the inner surface of the glass window panel. For example, and with reference to FIGS. 29 and 30, a lighting device 522 may be configured to be attached at a pair of brackets 528 bonded at the inner surface 515b of a glass window panel 515. Such an attachment allows for removal of the lighting device 522 from the window panel, such as for service or replacement of the lighting device. The lighting device 522 may otherwise be substantially similar to any of the lighting devices 22, 122, 222, 322 and 422, discussed above, such that a detailed discussion of the lighting devices need not be repeated herein.

Thus, the lighting devices of the present invention are configured to attach directly to the glass window panel (such as via bonding a housing portion of the lighting device at the glass surface or such as via attaching a housing portion of the lighting device to one or more brackets bonded at the glass surface). Optionally, the lighting devices of the present invention may be disposed above or may be formed as part of an upper channel or rail of a rear slider window assembly, with the rail bonded directly at the glass surface. Optionally, the lighting devices of the present invention are suitable for direct attachment at the inner surface of a rear window panel for a non-slider window application (see, for example, FIG. 29). Thus, the lighting device is not attached to the sheet metal of the vehicle and does not require an impression in the sheet metal. Instead, the lighting device is mounted at the inner surface of the glass window panel, and thus is disposed inside the vehicle, whereby the lighting device has reduced exposure to the exterior environment, such as to moisture or the like.

Therefore, the present invention provides a rear window assembly for a pickup truck that provides a smooth exterior appearance (see FIG. 27) and avoids use of a lens on the sheet metal and an applique on the glass panel. The present invention provides a single modular system that eliminates the need for two or more separate assemblies in the assembly plant. The present invention provides environment improvement by disposing the lighting device at an interior region of the vehicle. The lighting device may be a common lighting device for either a rear slider window assembly or a non-slider window assembly. The present invention provides a reduction of labor at the vehicle assembly plant, and eliminates labor at the assembly plant for installing a separate center high mounted stop lamp (CHMSL), while simplifying the assembly at the window manufacturing plant. The present invention also provides for increased window roofline height by allowing the cutline to be moved upward, and provides for simplified sheet metal stamping by eliminating any light impression in the vehicle cab sheet metal (that may be required for conventional separate lights). The lighting device and window assembly of the present invention also provides improved serviceability and may increase life cycles of rear lights by up to about 50,000 hours. The lighting device and window assembly of the present invention also reduces or substantially eliminates leak paths that often occur between traditional CHMSLs and the vehicle sheet metal.

Thus, the window assembly of the present invention provides lighting behind the fixed window panel to provide a flush glass window with no separate stop lamp or bed lighting at or above the window (such as at the vehicle cab or at a molding or frame of the window assembly). The light sources or LED strips are disposed at the inner surface of the fixed window panel and have no part that protrudes from the glass or that is in any perimeter frame or molding of the window assembly or vehicle. Thus, the window assembly of the present invention allows the glass window panel to be a larger window because no frame or vehicle portion is needed above the window panel for the center high mounted stop lamp or the like. The light sources or LEDs may be powered via any suitable wiring or electrically conductive traces or busbars at the window assembly, and may be readily electrically connected to wiring or circuitry of the vehicle when the window assembly is installed at the vehicle.

The illumination sources and lighting device thus may comprise a brake light, such as for a center high mounted stop lamp of the vehicle, whereby the illumination source may be activated upon actuation of the vehicle brakes. Optionally, the lighting device may comprise an illumination source or light for illuminating the bed of the pickup, such as one or more lights that are directed so as to provide white (or substantially white) light or illumination to illuminate the pickup bed, such as in response to a user input or button or switch. Optionally, the window assembly may include a first illumination source or first set of LEDs for a center high mounted stop lamp and may include a second illumination source or second set of LEDs for another function or feature (such as for providing light to the pickup bed). Although shown as being disposed at the fixed panel of a rear slider window assembly, the lighting device of the present invention may be disposed at a fixed window panel of a full-pane fixed (non-slider) rear window assembly or the like.

The fixed window panel may include an opaque or substantially opaque perimeter coating or layer, such as a black frit layer or the like, and the light sources may emit light that passes through the opaque coating or through apertures established through the opaque coating. Optionally, an illumination source or lighting may be located at or near an outer corner of the window assembly, such as to provide a turn signal indicator or pickup bed illumination or the like at the outer ends or sides of the window assembly. For example, a turn signal indicator (comprising one or more orange or amber colored LEDs or the like) may be disposed at the upper corners of the window panel (or the lower corners). The turn signal indicator may be located at and behind the opaque layer (and optionally a window or non-opaque region may be established at the turn signal indicator). For example, an arrow-shaped or chevron-shaped or triangular-shaped window or aperture may be established through an opaque region of the window and generally at the turn signal indicator, such that, when the indicator is activated, the light is emitted through the arrow-shaped window to provide the turn signal direction to a person viewing the rear window assembly from exterior and rearward/sideward of the vehicle. Optionally, the turn signal indicators may be disposed elsewhere at the window assembly (and behind the fixed window panel), such as at the upper region of the window panel, with the arrow-shaped apertures or masks providing the directional information for the indicators.

Optionally, the turn signal indicator may comprise a strip of a plurality of LEDs, and the directional information may be conveyed by the location of the LEDs and/or by serial activation of the LEDs from one end of the strip to the other.

Optionally, although shown and described as having light sources that emit light through the window panel and thus in a rearward direction with respect to the vehicle, it is envisioned that the window assembly of the present invention may have a lighting device that includes light sources that are directed forwardly and towards and into the interior cabin of the vehicle. For example, the lighting device may include one or more light sources at a separate part of the housing and with an aperture or transparent portion that faces the interior cabin of the vehicle (and that may correspond with an aperture or opening at the headliner of the vehicle), such that light emitted by the one or more light sources may illuminate at least a portion of the interior cabin of the vehicle. The housing of the lighting device may have a transparent or translucent cover or portion through which the emitted light passes and/or the headliner may include a transparent or translucent cover or panel at the lighting device.

The interior lighting function may provide illumination of the cabin or may provide a more directed or focused lighting function, such as for a reading light or the like for a passenger sitting in a rear seat of the vehicle. The interior lighting function may be provided via two or more light sources or lighting devices or sets of light sources, such as one at or near an upper corner region of the window assembly, such that light emitted by the light sources is not at a central region that may reflect off of the interior rearview mirror to cause glare to the driver. Optionally, the interior lighting function or feature of the lighting device of the rear slider window assembly may be directed partially downward and/or may include baffling or other light blocking means to limit the emitted light from being directed towards the interior rearview mirror of the vehicle.

The present invention thus may provide for an interior cabin lighting function that is part of or integrated with the rear slider window assembly of the vehicle, thus reducing or eliminating the need for a separate interior cabin light at the headliner of the vehicle (and thus reducing or eliminating the need for a separate wiring harness to a central light of the interior cabin of the vehicle). The lighting device(s) of the rear slider window assembly may be connected to a wiring harness that includes existing wires that electrically connect to and power the heater grid of the rear slider window assembly. Thus, the lighting device(s) of the rear slider window assembly can be powered via expansion of an existing wiring harness (to include additional wires for powering and control of the lighting devices), thereby enhancing assembly and electrical connection of the interior lighting devices at the vehicle.

Therefore, an illumination source or lighting device or lighting devices may be implemented with a rear horizontal slider window assembly, whereby the illumination source may be readily viewable at the window assembly with the wiring and attachment brackets behind the fixed window panel of the window assembly and not readily viewable by a person viewing the window assembly from exterior and/or rearward of the vehicle. The mounting portions of the illumination source or sources and the electrical wiring of the illumination source or sources may be positioned along the fixed window panel and along the upper rail of the window assembly, whereby the illumination source or sources may be readily electrically connected to a wiring harness of the vehicle as the window assembly is installed at the vehicle. Because the lighting device is disposed behind the fixed window panel of the vehicle, the lighting device and lighting system of the present invention provides a flush or substantially flush lighting device or devices at the rear slider window assembly.

The movable or slider window panel may be movable such as via manual pushing or pulling at the window panel and preferably is movable in response to actuation of a drive motor of the drive motor assembly or system, which may move cables or wires of cable assemblies relative to the sheath of the cable assemblies to impart horizontal movement of the carrier and slider window panel along the upper and lower rails. Optionally, the drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293 and/or 8,938,914, and/or U.S. Publication Nos. 2004-0020131 and/or 2008-0127563, which are all hereby incorporated herein by reference in their entireties.

Optionally, the fixed window panel or panels may include an electrically conductive heater grid or other heating element or electrically operable element established at the window panel or panels (such as at or on an interior surface of the window panel) and the movable window panel may include an electrically conductive heater grid or other heating element or electrically operable element established at the movable window panel (such as at or on an interior surface of the movable window panel). The heater grids are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels. The movable panel heater grid is electrically connected to the power source (and may be electrically connected to electrical terminals or elements at one of the heater grids of the fixed window panels) and may be electrically powered to heat or defrost or defog the movable window panel. The heater grids comprise a plurality of electrically conductive traces that extend across the respective window panels between respective busbars to provide enhanced and more uniform heating and defrosting/defogging of the window panel, as also discussed below. The heater grid of the movable window panel may be powered in a manner that allows for heating or defogging or defrosting of the movable window panel irrespective of whether the movable window panel is opened or partially opened or closed. For example, the electrical connections may be made via a flexible connector or wire or cable or the like, such as by utilizing aspects of the rear slider window assemblies described in U.S. Pat. Nos. 8,881,458 and/or 8,402,695, which are hereby incorporated herein by reference in their entireties. Optionally, the heater grid of the movable window panel may be powered only when in its closed position and/or via any suitable powering means.

The benefits of embodiments of the present invention may also be realized in sliding window constructions where an aperture is created in a fixed window panel and where a movable window panel can be made to open or close the aperture. Slider windows of this type are disclosed such as in U.S. Pat. Nos. 8,915,018 and/or 8,881,458, and/or U.S. Publication No. 2003-0213179 and/or RE41502, which are hereby incorporated herein by reference in their entireties. The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. 2006-0107600; 2008-0127563; 2004-0020131 and/or 2003-0213179, and/or International Publication No. WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invetion claimed is:

1. A rear window assembly for a vehicle, said rear window assembly comprising:
   a window panel configured to be disposed at a rear portion of a cabin of a vehicle;
   a lighting device disposed at an inner surface of said window panel, wherein said lighting device is operable to emit light that passes through said window panel so as to be viewable by a person viewing said rear window assembly from exterior and rearward of the vehicle;
   wherein said lighting device comprises a first set of light sources and a second set of light sources;
   wherein said first set of light sources is operable as a brake light of the vehicle and is operable, when activated, to emit red light through said window panel;
   wherein said lighting device is configured such that, when said first set of light sources is activated, red light is emitted through said window panel so as to be viewable from rearward of the vehicle;
   wherein said second set of light sources is operable as an illumination device of the vehicle and is operable, when activated responsive to a user input, to emit white light through said window panel to illuminate a rear portion of the vehicle;
   wherein said lighting device is configured such that, when said second set of light sources is activated, white light is emitted through said window panel and generally downwardly so as to illuminate a rear portion of the vehicle; and
   wherein said lighting device comprises a first reflector that, when said first set of light sources are activated, reflects light emitted by said first set of light sources through said window panel so as to be viewable from rearward of the vehicle, and wherein said lighting device comprises a second reflector that, when said second set of light sources are activated, reflects light emitted by said second set of light sources through said window panel and generally downwardly so as to illuminate a rear portion of the vehicle.

2. The rear window assembly of claim 1, wherein said first and second set of light sources are arranged generally co-linear with one another.

3. The rear window assembly of claim 1, wherein said first set of light sources is disposed above said second set of light sources.

4. The rear window assembly of claim 1, wherein said rear window assembly is configured to be disposed at a rear portion of a cabin of a pickup truck, and wherein said second set of light sources, when activated responsive to the user input, emit white light through said window panel to illuminate a truck bed of the pickup truck.

5. The rear window assembly of claim 4, wherein said rear window assembly comprises a rear slider window assembly comprising a movable window panel and a frame portion having an upper rail and a lower rail, and wherein said window panel is fixed relative to said frame portion, and wherein said window panel comprises at least one fixed window panel defining an opening, and wherein said movable window panel is movable along said upper rail and said lower rail, and wherein said movable window panel is movable between a closed position, where said movable window panel is disposed at said opening, and an opened position, where said movable window panel is disposed at least partially along said window panel, and wherein said lighting device is disposed along an upper region of said at least one window panel and above said opening.

6. The rear window assembly of claim 5, wherein said lighting device is disposed at least partially along said upper rail.

7. The rear window assembly of claim 1, wherein said lighting device is adhesively attached at said inner surface of said window panel.

8. The rear window assembly of claim 1, wherein said lighting device is attached at at least one mounting element adhesively attached at said inner surface of said window panel.

9. The rear window assembly of claim 1, wherein said lighting device comprises a third light source, and wherein said third light source, when activated, emits light into the cabin of the vehicle to illuminate at least a portion of the cabin.

10. The rear window assembly of claim 9, wherein said lighting device comprises a housing disposed at said inner surface of said window panel, and wherein said housing houses said first set of light sources, said second set of light sources and said third light source.

11. The rear window assembly of claim 10, wherein said housing is open at a side facing said inner surface of said window panel and wherein said third light source, when activated, emits light through a light transmissive portion of a wall of said housing.

12. A rear window assembly for a vehicle, said rear window assembly comprising:
  a window panel configured to be disposed at a rear portion of a cabin of a vehicle;
  a lighting device disposed at an inner surface of said window panel, wherein said lighting device is operable to emit light that passes through said window panel so as to be viewable by a person viewing said rear window assembly from exterior and rearward of the vehicle;
  wherein said lighting device comprises a first set of light sources and a second set of light sources;
  wherein said first set of light sources is operable as a brake light of the vehicle and is operable, when activated, to emit red light through said window panel;
  wherein said lighting device is configured such that, when said first set of light sources is activated, red light is emitted through said window panel so as to be viewable from rearward of the vehicle;
  wherein said second set of light sources is operable as an illumination device of the vehicle and is operable, when activated responsive to a user input, to emit white light through said window panel to illuminate a rear portion of the vehicle;
  wherein said lighting device is configured such that, when said second set of light sources is activated, white light is emitted through said window panel and generally downwardly so as to illuminate a rear portion of the vehicle; and
  wherein a first lens element is disposed at each of said light sources of said first set of light sources, and wherein said first set of light sources is disposed at a first circuit board of said lighting device that is configured such that said first lens elements function to, when said first set of light sources is activated, direct light emitted by said first set of light sources through said window panel so as to be viewable from rearward of the vehicle, and wherein a second lens element is disposed at each of said light sources of said second set of light sources, and wherein said second set of light sources is disposed at at least one second circuit board of said lighting device that is configured such that said second lens elements are directed partially downwardly and function to, when said second set of light sources is activated, direct light emitted by said second set of light sources through said window panel and generally downwardly so as to illuminate a rear portion of the vehicle.

13. The rear window assembly of claim 12, wherein said rear window assembly is configured to be disposed at a rear portion of a cabin of a pickup truck, and wherein said second set of light sources, when activated responsive to the user input, emit white light through said window panel to illuminate a truck bed of the pickup truck, and wherein said rear window assembly comprises a rear slider window assembly comprising a movable window panel and a frame portion having an upper rail and a lower rail, and wherein said window panel is fixed relative to said frame portion, and wherein said window panel comprises at least one fixed window panel defining an opening, and wherein said movable window panel is movable along said upper rail and said lower rail, and wherein said movable window panel is movable between a closed position, where said movable window panel is disposed at said opening, and an opened position, where said movable window panel is disposed at least partially along said window panel, and wherein said lighting device is disposed along an upper region of said at least one window panel and above said opening.

14. The rear window assembly of claim 13, wherein said lighting device is disposed at least partially along said upper rail.

15. The rear window assembly of claim 12, wherein said lighting device is adhesively attached at said inner surface of said window panel.

16. The rear window assembly of claim 12, wherein said lighting device is attached at at least one mounting element adhesively attached at said inner surface of said window panel.

17. The rear window assembly of claim 12, wherein said lighting device comprises a third light source, and wherein said third light source, when activated, emits light into the cabin of the vehicle to illuminate at least a portion of the cabin.

18. The rear window assembly of claim 17, wherein said lighting device comprises a housing disposed at said inner surface of said window panel, and wherein said housing houses said first set of light sources, said second set of light sources and said third light source.

19. The rear window assembly of claim 18, wherein said housing is open at a side facing said inner surface of said window panel and wherein said third light source, when activated, emits light through a light transmissive portion of a wall of said housing.

20. A rear window assembly for a vehicle, said rear window assembly comprising:
  a window panel configured to be disposed at a rear portion of a cabin of a vehicle;
  a lighting device disposed at an inner surface of said window panel, wherein said lighting device is operable to emit light that passes through said window panel so as to be viewable by a person viewing said rear window assembly from exterior and rearward of the vehicle;
  wherein said lighting device comprises a housing that houses a first set of light sources, a second set of light sources, and a third light source;
  wherein said first set of light sources is operable as a brake light of the vehicle and is operable, when activated, to emit red light through said window panel;

wherein a first lens element is disposed at said first set of light sources, and wherein said lighting device is configured such that, when said first set of light sources is activated, light emitted by said first set of light sources passes through said first lens element and through said window panel so as to be viewable from rearward of the vehicle;

wherein said second set of light sources is operable as an illumination device of the vehicle and is operable, when activated responsive to a user input, to emit white light through said window panel to illuminate a rear portion of the vehicle;

wherein a second lens element is disposed at said second set of light sources, and wherein said lighting device is configured such that, when said second set of light sources is activated, light emitted by said second set of light sources passes through said second lens element and through said window panel and generally downwardly so as to illuminate a rear portion of the vehicle; and wherein said third light source is operable as an interior illumination device of the vehicle and is operable, responsive to a user input, to emit white light into the cabin of the vehicle.

21. The rear window assembly of claim 20, wherein said rear window assembly is configured to be disposed at a rear portion of a cabin of a pickup truck, and wherein said second set of light sources, when activated responsive to the user input, emit white light through said window panel to illuminate a truck bed of the pickup truck, and wherein said rear window assembly comprises a rear slider window assembly comprising a movable window panel and a frame portion having an upper rail and a lower rail, and wherein said window panel is fixed relative to said frame portion, and wherein said window panel comprises at least one fixed window panel defining an opening, and wherein said movable window panel is movable along said upper rail and said lower rail, and wherein said movable window panel is movable between a closed position, where said movable window panel is disposed at said opening, and an opened position, where said movable window panel is disposed at least partially along said window panel, and wherein said lighting device is disposed along an upper region of said at least one window panel and above said opening.

22. The rear window assembly of claim 21, wherein said lighting device is disposed at least partially along said upper rail.

23. The rear window assembly of claim 20, wherein said lighting device is adhesively attached at said inner surface of said window panel.

24. The rear window assembly of claim 20, wherein said lighting device is attached at at least one mounting element adhesively attached at said inner surface of said window panel.

25. The rear window assembly of claim 20, wherein said housing is open at a side facing said inner surface of said window panel.

26. The rear window assembly of claim 20, wherein said third light source, when activated, emits light through a light transmissive portion of a wall of said housing.

27. The rear window assembly of claim 20, wherein said lighting device comprises a first reflector that, when said first set of light sources are activated, reflects light emitted by said first set of light sources through said first lens element and through said window panel so as to be viewable from rearward of the vehicle, and wherein said lighting device comprises a second reflector that, when said second set of light sources are activated, reflects light emitted by said second set of light sources through said second lens element and through said window panel and generally downwardly so as to illuminate a rear portion of the vehicle.

* * * * *